(12) United States Patent
Mohanty et al.

(10) Patent No.: US 8,151,018 B2
(45) Date of Patent: Apr. 3, 2012

(54) DUAL-MODE DATA TRANSFER OF UNCOMPRESSED MULTIMEDIA CONTENTS OR DATA COMMUNICATIONS

(75) Inventors: Soumendra Mohanty, San Jose, CA (US); Ning Zhu, San Jose, CA (US)

(73) Assignee: Analogix Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 12/889,796

(22) Filed: Sep. 24, 2010

(65) Prior Publication Data

US 2011/0087806 A1    Apr. 14, 2011

Related U.S. Application Data

(60) Provisional application No. 61/246,060, filed on Sep. 25, 2009.

(51) Int. Cl.
    *G06F 3/01* (2006.01)
(52) U.S. Cl. ............................................. 710/51; 710/38
(58) Field of Classification Search .................. None
    See application file for complete search history.

(56) References Cited

U.S. PATENT DOCUMENTS

| | | |
|---|---|---|
| 6,098,130 A | 8/2000 | Wang |
| 2007/0206641 A1 | 9/2007 | Egan |
| 2008/0250294 A1 | 10/2008 | Ngo et al. |
| 2008/0263621 A1 | 10/2008 | Austerlitz et al. |
| 2008/0291994 A1 | 11/2008 | Lida et al. |
| 2009/0094387 A1 | 4/2009 | Bunger et al. |
| 2011/0243035 A1* | 10/2011 | Hall et al. ............ 370/276 |

OTHER PUBLICATIONS

Icron, USB over DisplayPort, retrieved from http://www.icron.com, pp. 1-2.*
Softpedia, DisplayPort to Support USB 2.0 Traffic, Jan. 2008, retrieved from http://news.softpedia.com/news/DisplayPort-to-Support-USB-2-0-Traffic-76320.shtml.*

* cited by examiner

*Primary Examiner* — Cheng-Yuan Tseng
(74) *Attorney, Agent, or Firm* — Carr & Ferrell LLP

(57) ABSTRACT

A system and corresponding method for transferring data. Data may be selectively communicated via a USB port of a device. An indication of a device type may be received at the USB port from an external interface. USB protocol data or uncompressed high definition media data may be caused to be selectively supplied to the USB port as a function of the indication. The selected data may be transmitted via the USB port to an external interface. The uncompressed high definition media data may include at least one lane of media data or multimedia data in accordance with a DisplayPort standard. In some embodiments, either USB protocol data or multimedia data comprising audio data and uncompressed high definition video data may be caused to be selectively supplied to the USB port as a function of the indication. The indication may be a data format signal.

37 Claims, 15 Drawing Sheets

| Detection state | Compatiblity |
|---|---|
| Ground | USB |
| floating | USB |
| 124k ohm | USB |
| 68k ohm | USB |
| 36.5k ohm | USB |
| 10k ohm | HD uncompressed media data signal |

DUAL-MODE DATA TRANSFER OF UNCOMPRESSED MULTIMEDIA CONTENTS OR DATA COMMUNICATIONS

CROSS-REFERENCE TO RELATED APPLICATION

The present application claims priority benefit to U.S. Provisional Patent Application No. 61/246,060 filed Sep. 25, 2009 and entitled "Dual-Mode Data Transfer of Uncompressed Multimedia Contents or Data Communications between Two Appliances," herein incorporated by reference.

FIELD OF INVENTION

The present invention relates generally to data transfer and, more particularly, to dual-mode transfer of uncompressed multimedia contents or data communications.

BACKGROUND

A Universal Serial Bus (USB) communication standard is a universal wired interface and protocol to enable electronic devices to exchange data. Various connectors are specified for information exchange in accordance with the standard. One or more dedicated USB ports, i.e., USB connectors, are typically employed in an electronic device. There are three basic types of connectors identified in various USB 2.0 Specifications: Standard, Mini-USB, and Micro-USB connectors. In USB 3.0 Specifications, two basic types of connectors are defined: Standard, and Micro-USB connectors. The USB port of a device is typically coupled to the USB port of another device via a cable. A USB transceiver may be employed in each device to send and receive USB protocol signals to and from the corresponding USB port. Additionally, the USB protocol defines the power and ground connectivity between the two devices.

A DisplayPort (DP) communication standard is an interface and link protocol for transferring high definition video/audio and data across computer systems and electronics devices. The Video Electronics Standards Association (VESA) has defined various standards versions, which are incorporated by reference herein, including 1.1, 1.1a and 1.2. The DisplayPort standard defines a multi-laned one-way serial interface for connecting a source device, such as a system that generates a media or multimedia signal, i.e., video and/or audio, with a sink device, such as a display that renders the signal in audio-visual manner. Additionally, the DisplayPort standard defines a two way serial communication side-band channel, along with the multi-laned serial interface, for device configurations on either side of the connected link to identify and set the correct transmission of the multimedia content. The DP communications standard is defined by VESA as royalty free.

The DP protocol is scalable in terms of usable bandwidth and has a higher bandwidth than the high definition multimedia interface (HDMI) standard. The DP protocol uses one to four pairs of communication lines (called lanes) depending on the bandwidth needed to transmit a single video/audio stream. In case the link does not need four lanes to transfer information, one or two lanes can also be used to transfer one stream of video/audio data depending on the bandwidth needed. The two-way serial communication side-band channel is responsible for setting up the lanes requirement and other communications on both sides.

A dedicated DP protocol connector may be employed in a device for multimedia content communication with an external device in accordance with the DP communication standard. Most electronic devices that support wired data communication employ one or more USB connectors, but does not include a DP protocol connector due to size or upgradability limitations. What is needed is a more efficient system for communicating with devices having different communication protocols.

SUMMARY OF THE INVENTION

Various embodiments provide a system and method for transferring data. Universal Serial Bus (USB) protocol data or uncompressed high definition media data may be transmitted based on a detected communication type. A selected data type may be selectively supplied to a USB port of a device based on the detected connection type. Data corresponding to the selected data type can be transmitted via the USB port to the external interface. The uncompressed high definition media data may comprise at least one lane of media or multimedia data in accordance with a DisplayPort standard. Also, a two-way serial communication side-band channel is provided for setting up the lanes requirement and other communications on both sides.

According to various embodiments, data is selectively communicated via a USB port of a first device. An indication of a device type may be received by the first device. The first device may generate a selection signal based on the received indication. USB protocol data or uncompressed high definition media data may be caused to be selectively supplied to the USB port based on the selection signal by the first device. The selectively supplied data can be transmitted via the USB port to an external interface.

In some embodiments, a system for transferring data may include a USB port and a USB transceiver circuit operative to send and receive USB protocol data signals. The system may also include a transmitter circuit operative to transmit uncompressed high definition media signals. A selection circuit operative to selectively couple the USB transceiver circuit or the transmitter circuit to the USB port based on a data format signal received at the USB port may also be included.

A system for transferring data via a USB port may be provided in some embodiments. The system may include a first device including a USB port and a USB transceiver circuit operative to send and receive USB protocol signals. The first device may also include a transmitter circuit operative to transmit uncompressed high definition media signals, and a selection circuit. The selection circuit may be operative to selectively couple the USB transceiver circuit or the transmitter circuit to the USB port based on a data format signal received at the USB port. The system may also include an interface unit to communicatively couple the USB port to a port of a second device over an interface.

According to various embodiments, a system for transferring data including a USB port and a semiconductor device may be provided. The semiconductor device may include a USB transceiver circuit operative to send and receive USB protocol signals. A transmitter circuit operative to transmit uncompressed high definition media signals may also be included in the semiconductor device. In some embodiments, the semiconductor device also includes a serializer/deserializer circuit and a multiplexer. The multiplexer may be configurable to selectively couple the USB transceiver circuit or the transmitter circuit to the serializer/deserializer based on a data format signal received at the USB port from an external interface.

BRIEF DESCRIPTION OF THE DRAWINGS

FIG. 3 is an exemplary table illustrating compatibility for various detection states of the system.

DETAILED DESCRIPTION OF EXEMPLARY EMBODIMENTS

A system and corresponding method for transferring data is provided. Universal Serial Bus (USB) protocol data or uncompressed high definition media data may be selectively supplied to a USB port of a device based on an indication of a device type received by the device. The selected data can be transmitted via the USB port to an external interface. The uncompressed high definition media data may comprise at least one lane of media (or multimedia) data in accordance with a DisplayPort standard. The indication may be received at the USB port from an external interface and may be indicative of a USB mode or a media mode. In the USB mode, the USB protocol data is supplied to the USB port. In the media mode, high definition media data from the transmitter is supplied to the USB port. The device may be configured in the USB mode to receive USB protocol data via the USB port from the external interface. The external interface may be coupled to another device for transferring the USB protocol data or uncompressed high definition media data.

The uncompressed high definition media data may comprise at least one lane of media or multimedia data in accordance with a DisplayPort standard. Also, a two-way serial communication side-band channel is provided for setting up the lanes requirement and other communications on both sides. This channel may accommodate 3-wires (namely AUXP, AUXN and HPD) of communication into a single wire externally to both the devices on either side. Internal to the device, the signals through the three wires may be encoded, electrically transmitted across and then decoded on the other side. An extra layer of protocol may be defined on top of a standard, such as a DisplayPort Standard, to accomplish this task over 1-wire have it transmitted or received over 1-pin of the USB Port.

Figure 1A:
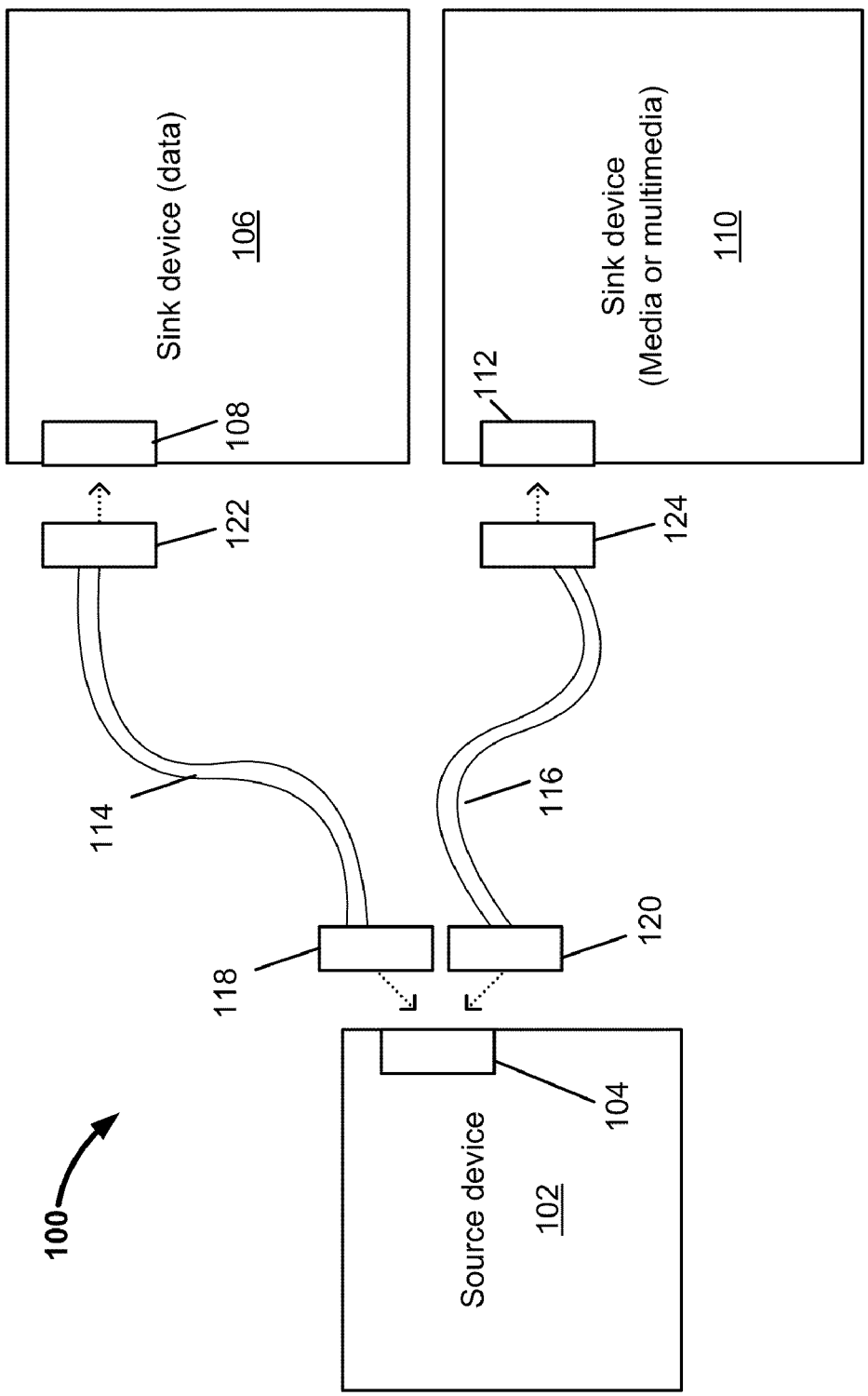
FIG. 1A is a block diagram of an environment for dual-mode data transfer of uncompressed multimedia contents or data communications.

FIG. 1A is an exemplary block diagram of an environment 100 for dual-mode data transfer of uncompressed media (or multimedia) contents or data communications. The environment includes a system for transferring data according to various embodiments. The environment 100 includes a source device 102, a first sink device 106, and a second sink device 110. Source device 102 has a USB port 104, first sink device 106 includes a USB port 108, and second sink device 110 includes a DisplayPort port 112.

The source device 102 may provide an output of data in USB format or in another data transmission format over port 104. Source device may communicate with first sink device 106 via cable 114 and with second sink device 110 via cable 116. An exemplary source device 102 is discussed in more detail below with respect to FIG. 1B.

The USB port 104 and USB port 108 may be one of various types including, but not limited to, a Micro-USB connector in accordance with a USB 3.0 specification standard, a Mini-USB connector in accordance with a USB 2.0 specification standard, and a Micro-USB connector in accordance with a USB 2.0 specification standard. The term "port" may also be referred to herein as a receptacle or connector. Hence, "port" as used herein is merely explanatory for emphasizing the function as a receptacle included as part of a device that may accept a corresponding connector (plug).

A USB cable 114 may be used to source device 102 with first sink device 106 via USB ports 104 and 108 of devices 102 and 106, respectively. Device 106 may be also considered a master or a slave device, at least because USB transactions are bi-directional. Hence, either end of the USB connection (for example, device 106) may be considered either the master or the slave device in the connection, depending on who controls the transaction and what devices are connected on both sides. The USB cable 114 may have a USB connector 118 at one end and a USB connector 122 at the other end. The USB connectors 118 and 122 may each be configured to "plug" into the corresponding USB ports 104 and 108.

Media cable 116 may be used to couple source device 102 with second sink device 110. Media cable 116 includes a connector 120 at one end and a connector 124 at the other end. The connector 120 may be a USB connector configured to plug into port 104 of source device 102, and connector 124 may couple to port 112 of the second sink device 110. Media cable 116 may include conductors, circuits and other components to couple the connectors 120 and 124.

First sink device 106 may receive and/or transmit data in accordance with a USB standard or protocol. Though source device 102 may typically act as a "host" in a connection with first sink device 106, first sink device 106 may also act as a host in the connection. Examples of first sink device 106 include a camera, smart phone, and video cam.

Second sink device 110 may receive media (audio or video) or multimedia (both audio and video) signals via the media cable 116 and provide a media output (video and/or audio) or otherwise process the received data. Port 112 on second sink device 110 may be a media or multimedia port. In some embodiments, second sink device 110 is a Display Port compatible device, and port 112 is configured to receive a DisplayPort compatible connection. Port 112 and connector 124 may also be compatible with other media or multimedia standards. Examples of sink device 110 include a projector, television, or other media or multimedia capable device.

Figure 1B:
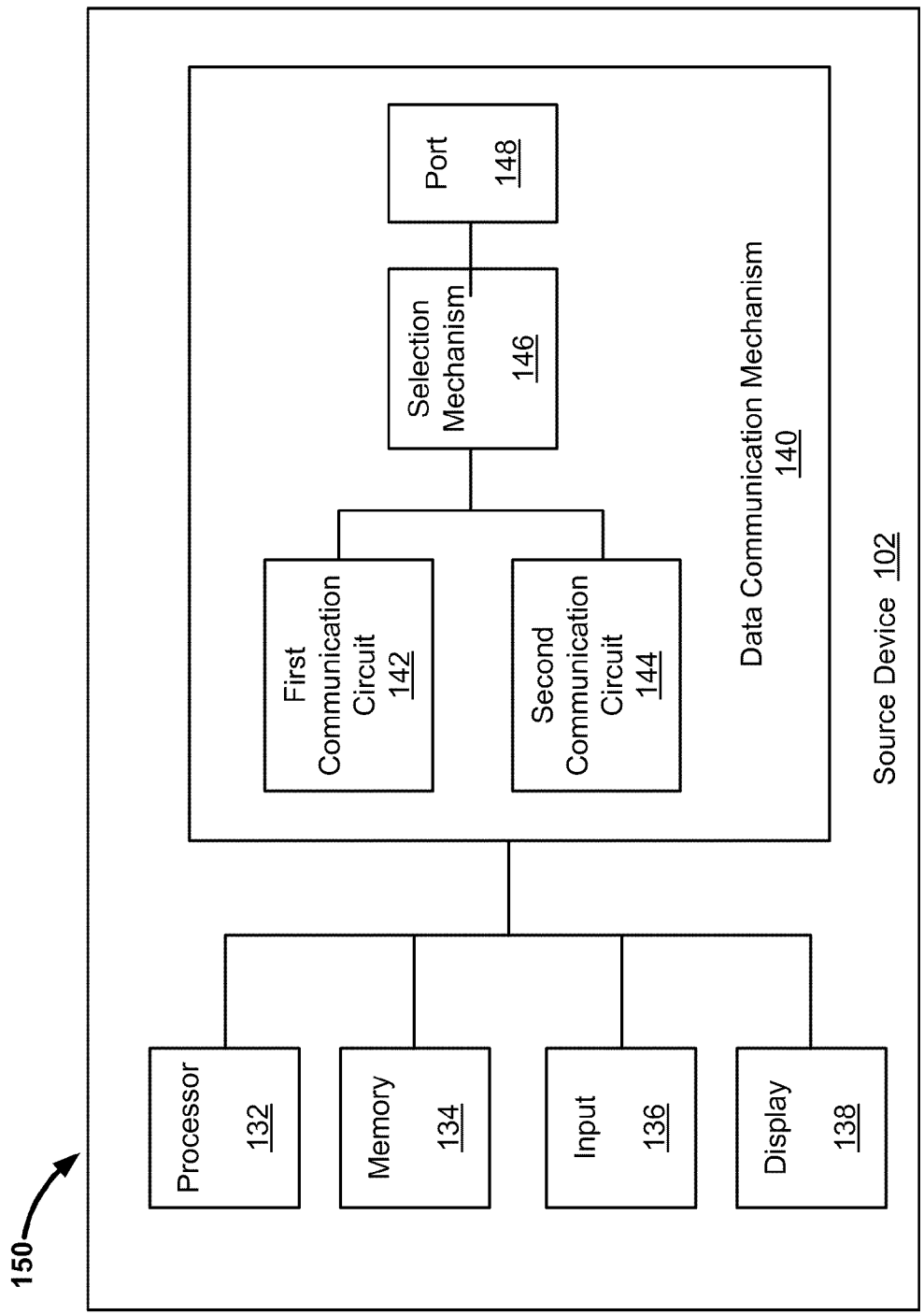
FIG. 1B is a block diagram of an exemplary source device.

FIG. 1B is a block diagram of an exemplary source device 150. Source device 150 may be used to implement source device 102 of FIG. 1A. Source device 150 includes a processor 132, memory 134, input 136, display 138, and data communication mechanism 140. Exemplary source device 150 may include additional or fewer components that those illustrated in FIG. 1B.

Processor 132 may be used to execute instructions that are stored in memory 134. Processor 132 may be implemented by one or more processors, one or more controllers, and other devices with execute instructions and control other devices.

Memory 134 may include a main memory for storing instructions as well as mass storage device, such as a magnetic disk drive or an optical disk drive. The mass storage device may include a non-volatile storage device for storing data and instructions for use by processor 132.

Input 136 may include one or more mechanisms for receiving data from a user or other system, such as but not limited to a keypad, various buttons, a touch screen, one or more microphones, and other input devices.

Display 138 may be a screen for providing an output to a user. The interface may be in the form of video or other media. The output may also be provided as audio, wireless data signal, or in some other data format over a suitable output mechanism (not illustrated in FIG. 1B).

Data communication mechanism 140 may include a first communication circuit 142, second communication circuit 144, selection mechanism 146, and port 148. Selection mechanism 146 may detect a connection type at port 148. Based on the detected connection type, selection mechanism 146 may enable communication through port 148 for either first communication circuit 142 or second communication port 144. The communication circuits 142 and 144 may communicate using different protocols, such as a USB 2.0 protocol, USB 3.0 protocol, a DataPort protocol, or some other protocol. The data signals sent by the different protocols of communication circuits 142 and 144 are configured to be sent over the same port 148. In some embodiments, data communication mechanism 140 may include more than two communication circuits and selectively configure communication over more than one port of source device 150. Exemplary data communication mechanisms are discussed in more detail below with respect to FIGS. 2, 4-11 and 14-15.

The source device 102 may be a device, portable or otherwise, having a USB port 104. The source device 102 may be, for example, small enough to be portable for a user, such as a cell phone or other mobile device. Mobile devices typically have a USB port operative for charging the battery of the device, and for data transfer and syncing with another device. The reduced size required for portability and transport may preclude adding another port for providing capability beyond these typical USB port capabilities.

Figure 2:
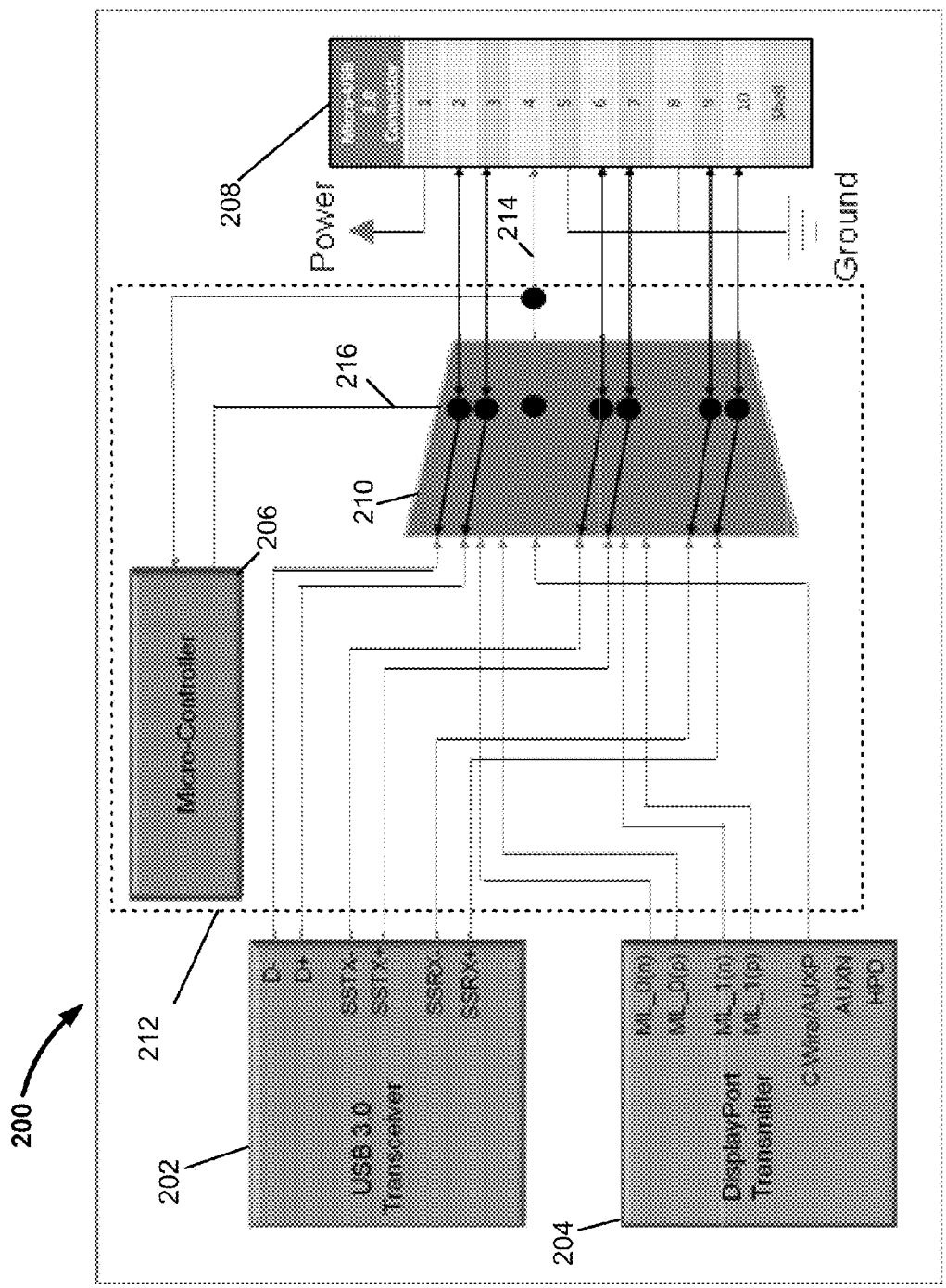
FIG. 2 is a block diagram of an exemplary data communication mechanism compatible with a Micro-USB 3.0 connector and selectively operating in a USB mode.

FIG. 2 is a block diagram of a exemplary system 200 for a source device having a Micro-USB 3.0 connector and selectively operating in a USB mode. The system 200 includes a USB 3.0 transceiver circuit 202, a DisplayPort transmitter circuit 204, a selection circuit 212, and a Micro-USB 3.0 connector 208. The USB 3.0 transceiver circuit 202 conforms to a USB 3.0 standard and may variously supply a data positive signal (D+), data negative signal (D−), super speed transmitter data positive signal (SSTX+), super speed transmitter data negative signal (SSTX−), super speed receiver data positive signal (SSRX+), and super speed receiver data negative signal (SSRX−). The D+ and D− signals are legacy USB 2.0 data signals, while the super speed signals are features of USB 3.0 for providing higher speed data communication.

The DisplayPort transmitter circuit 204 may be operative to transmit uncompressed high definition media signals. High definition media signals may include video signals having a resolution of at least a 720p, but may also include 720i, 1080i, 1080p video formats. In some embodiments, the uncompressed high definition media signals may be multimedia signals comprising both uncompressed high definition video data and compressed or uncompressed audio data.

DisplayPort transmitter circuit 204 may provide uncompressed high definition media or multimedia signals based at least in part on a DisplayPort standard. The signals may include at least one differential video data pair defining a lane in accordance with a DisplayPort standard. Two lanes are shown in the example in FIG. 2: lane number one differential pair, i.e., ML__0(n) and ML__0(p), and lane number two differential pair, i.e., ML__1(n) and ML__1(p). The DisplayPort transmitter circuit 204 provides uncompressed high definition media data that may include side-band communication data. In the example in FIG. 2, the side-band communication data is shown as a single C-wire signal that may be based on one or more of an Auxiliary channel positive signal (AUXP), an Auxiliary channel negative signal (AUXN), and a Hot Plug Detect signal (HPD) of the DisplayPort protocol.

In the environment 100 in FIG. 1, the source device 102 has a USB port 104. The Micro-USB 3.0 connector 208 is also referred to herein as the USB port 208 for the source device.

The selection circuit 212 includes a micro-controller 206 and a switch 210. In some embodiments, the switch 210 is an analog switch. The selection circuit 212 is operative to selectively couple the USB 3.0 transceiver circuit 202 or the DisplayPort transmitter circuit 204 to the USB port 208 based on an indication of a device type received through port 208. The indication may be received as a data format signal 214 received at a pin of the USB port 208 (see e.g., pin 4 of USB port 208). The pin of the USB port 208 may receive the device type indication from an external interface (see e.g., cables 114 and 116 in FIG. 1). The data format signal 214 is coupled to the micro-controller 206. In some embodiments, the micro-controller 206 may generate a selection signal 216 based on the data format signal 214 to cause the switch 210 to selectively couple either the USB 3.0 transceiver circuit 202 or the DisplayPort transmitter circuit 204 to the USB port 208. The micro-controller 206 may be a standalone device or be embedded in another device such as an application processor. The term "micro-controller" may also be referred to herein as a "controller".

The data format signal 214 provides an indication of a data format to communicate over port 208. According to various embodiments, a predetermined impedance may be coupled between one of the conductors of a cable (e.g., cables 114 and 116 in FIG. 1) and ground in order to provide the indication to the USB connector (USB port) connected to the cable. For instance, referring to FIG. 1, plugging in either respective connector 118 or 120 of the respective cables 114 and 116 into the USB port 104 (connector 208 in FIG. 2) provides an indication to the source device 102 of a data type associated with the cable. Although the indication is shown as the data format signal 214 received at pin 4 of connector 208, another suitable pin may be used to receive the indication.

FIG. 3 is an exemplary table 300 illustrating compatibility for various detection states of the system. The detection state represents detection of the predetermined impedance coupled to the cable conductor to provide the device type indication. The USB specification and the USB On-The-Go (OTG) supplement thereto define various impedances and corresponding states for an ID pin of the USB connector, e.g. pin 4 of connector 208 in the micro-USB 3.0 example in FIG. 2.

The first five detection states (i.e., ground, floating, 124 k ohm, 68 k ohm, and 36.5 k ohm) each represent a particular defined state compatible with a USB standard. Any of these first five states may thus provide an indication of USB compatibility. According to various embodiments, the detection state associated with USB compatibility, provides an indication of a USB device type. In the example in FIG. 2, responsive to the indication of a detection state associated with USB compatibility, the micro-controller 206 may generate a selection signal 216 to cause the switch 210 to selectively couple the USB 3.0 transceiver 202 to the USB port 208. For example, a USB cable such as the USB cable 114 in FIG. 1A may provide one of ground, floating, 124 k ohm, 68 k ohm, and 36.5 k ohm impedance detection states in FIG. 3 to provide an indication of USB compatibility.

An HD uncompressed media data signal may be indicated at the ID pin. For example, the uncompressed media data signal may have a detection state associated with an impedance other than that for a USB detection state and distinguishable from any USB detection state. Examples of such an impedance include 20 k ohm, 15 k ohm, 10 k ohm, 5 k ohm, or some other level of impedance. Though a particular impedance level of 10 k ohm may be discussed herein, different levels of impedance may be used to associate an uncompressed media data signal from USB signals at an ID pin.

According to various embodiments, a detection state shown in FIG. 3 corresponding to a 10 k ohm impedance indicates compatibility with a HD uncompressed media data signal cable, i.e., a media mode. Responsive to the indication of the media mode, the micro-controller 206 of selection circuit 212 may generate a selection signal 216 to cause the switch 210 to selectively couple the DisplayPort transmitter 604 to the USB port 208.

If the media cable 116 in FIG. 1A provides the 10 k ohm impedance and couples the second sink device 110 and the source device 102, a system 200 in the source device 102 may couple signals from the DisplayPort transmitter 604 to the USB port 208 for supplying via the media cable 116 to the sink device 110. The second sink device 110 may be operative to generate a display and/or audio presentation from the received signals.

Figure 4:
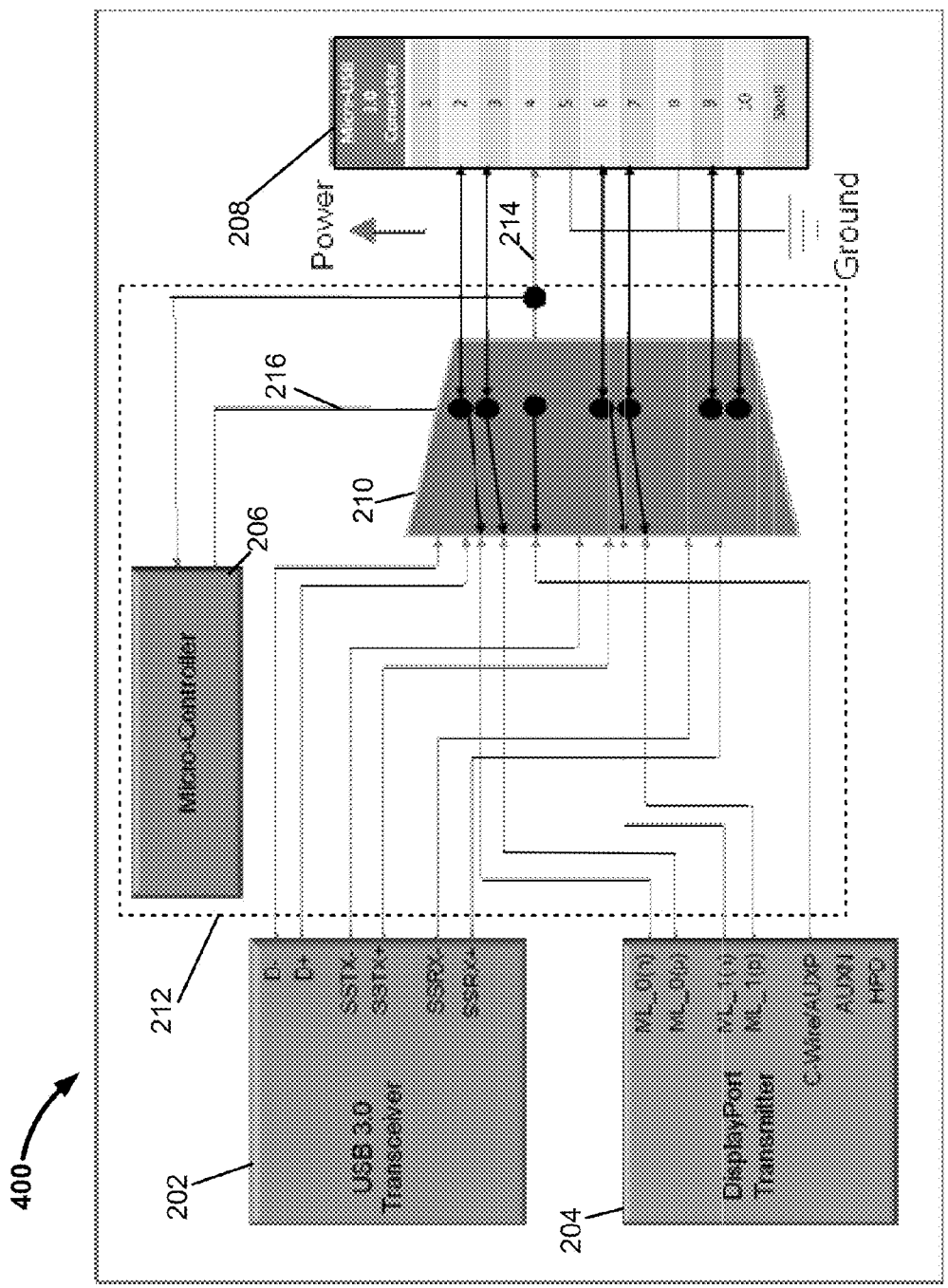
FIG. 4 is a block diagram of a exemplary data communication mechanism compatible with a Micro-USB 3.0 connector and selectively operating in a media mode.
Figure 5:
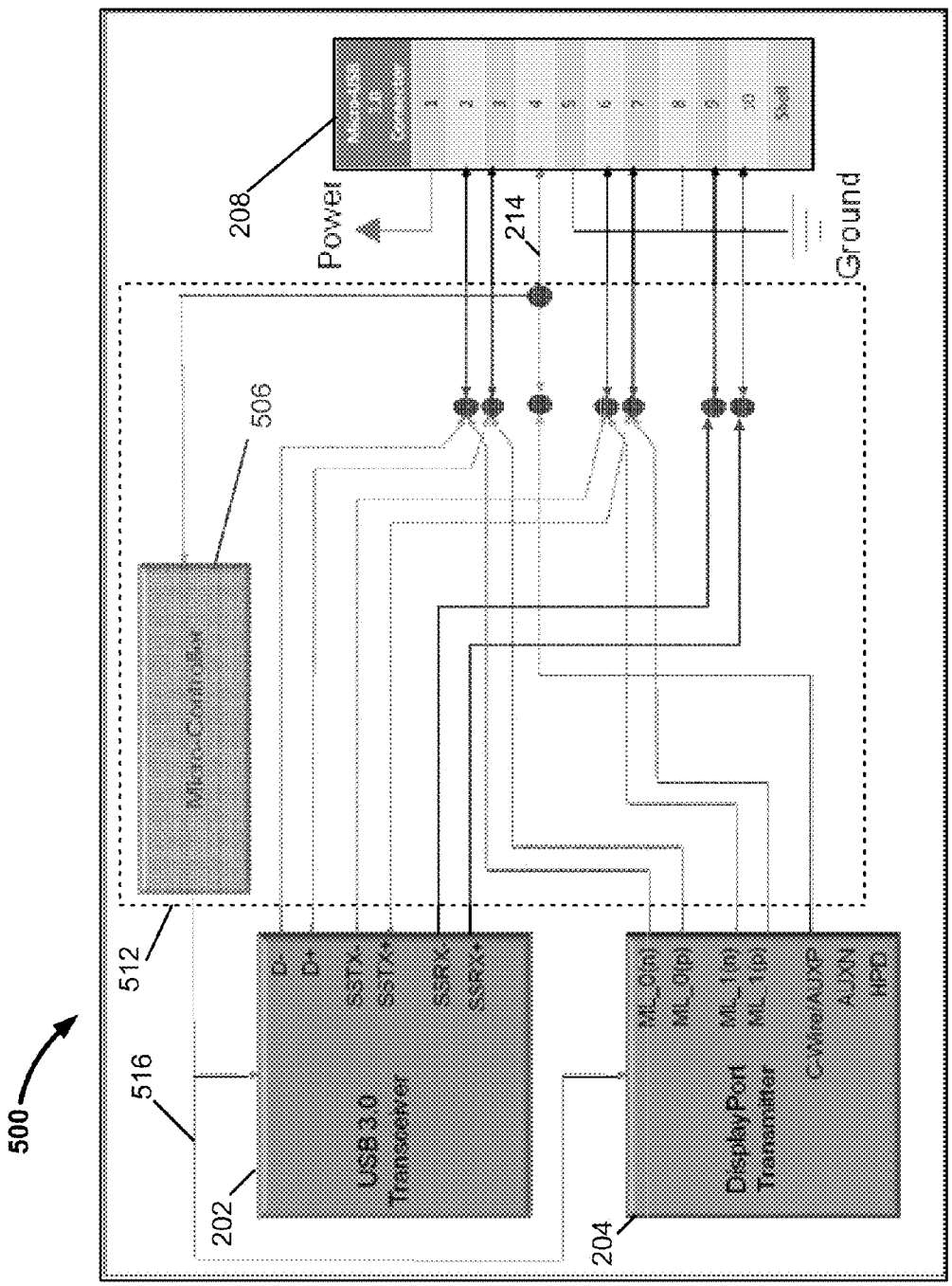
FIG. 5 is a block diagram of a exemplary data communication mechanism compatible with a Micro-USB 3.0 connector in accordance with some embodiments.

FIG. 5 is a block diagram of a exemplary system 500 for a source device having a Micro-USB connector in accordance with some embodiments. The system 500 includes a USB 3.0 transceiver circuit 202, a DisplayPort transmitter circuit 204, and a Micro-USB 3.0 connector 208, similar to the systems 200 and 400 in FIGS. 2 and 4. System 500 does, however, have a different selection circuit, i.e., selection circuit 512, which may not include a switch. The selection circuit 512 may include a micro-controller 506 coupled to the USB 3.0 transceiver circuit 202 and the DisplayPort transmitter circuit 204. Selected outputs from the USB 3.0 transceiver circuit 202 and DisplayPort transmitter circuit 204 to be selectively coupled to the same pin of the connector 208 may be joined as shown in the FIG. 5.

The micro-controller 506 of the selection circuit 512 may selectively couple the USB 3.0 transceiver circuit 202 or the DisplayPort transmitter circuit 204 to the USB port 208 based on a data format signal 214 received at the USB port 208. A selection signal 516 may be generated by the micro-controller 506. The USB 3.0 transceiver circuit 202 or the DisplayPort transmitter circuit 204 may be enabled to communicate with the USB port 208 based on the selection signal 516. The circuit 202 or 204 that is not enabled by selection circuit 512 in the system 500 will not communicate any output to connector 208. The micro-controller 506 may be a standalone device or be embedded in another device such as an application processor.

According to various embodiments, signals from the DisplayPort transmitter circuit 204 may be selectively coupled to different pins of the USB port, e.g., USB port/Micro-USB 3.0 connector 208 in FIGS. 2, 4, and 5. Tables 1, 2, and 3 illustrate schemes 1-36 for various combinations of DisplayPort signals routing to the Micro-USB 3.0 connector and Micro-USB 3.0 connector pin numbers that may be used in some embodiments.

TABLE 1

DisplayPort Signals Routing to the Micro-USB 3.0 Connector

| Scheme 1 | Scheme 2 | Scheme 3 | Scheme 4 | Scheme 5 | Scheme 6 | Scheme 7 |
|---|---|---|---|---|---|---|
| PWR | PWR | PWR | PWR | PWR | PWR | PWR |
| AUXN | AUXP | AUXN | AUXP | AUXN | AUXP | AUXN |
| AUXP | AUXN | AUXP | AUXN | AUXP | AUXN | AUXP |
| HPD | HPD | HPD | HPD | HPD | HPD | HPD |
| (thru | (thru | (thru | (thru | (thru | (thru | (thru |
| MCU) | MCU) | MCU) | MCU) | MCU) | MCU) | MCU) |
| Ground | Ground | Ground | Ground | Ground | Ground | Ground |
| ML_0(n) | ML_0(n) | ML_0(p) | ML_0(p) | ML_0(n) | ML_0(n) | ML_1(n) |
| ML_0(p) | ML_0(p) | ML_0(n) | ML_0(n) | ML_0(p) | ML_0(p) | ML_1(p) |
| Ground | Ground | Ground | Ground | Ground | Ground | Ground |
| ML_1(n) | ML_1(n) | ML_1(n) | ML_1(n) | ML_1(p) | ML_1(p) | ML_0(n) |
| ML_1(p) | ML_1(p) | ML_1(p) | ML_1(p) | ML_1(n) | ML_1(n) | ML_0(p) |

TABLE 1-continued

| DisplayPort Signals Routing to the Micro-USB 3.0 Connector | | | | | Micro-USB 3.0 Connector Pin |
|---|---|---|---|---|---|
| Scheme 8 | Scheme 9 | Scheme 10 | Scheme 11 | Scheme 12 | Numbers N/A |
| PWR | PWR | PWR | PWR | PWR | 1 |
| AUXP | AUXN | AUXP | AUXN | AUXP | 2 |
| AUXN | AUXP | AUXN | AUXP | AUXN | 3 |
| HPD (thru MCU) | HPD (thru MCU) | HPD (thru MCU) | HPD (thru MCU) | HPD (thru MCU) | 4 |
| Ground | Ground | Ground | Ground | Ground | 5 |
| ML_1(n) | ML_1(p) | ML_1(p) | ML_1(n) | ML_1(n) | 6 |
| ML_1(p) | ML_1(n) | ML_1(n) | ML_1(p) | ML_1(p) | 7 |
| Ground | Ground | Ground | Ground | Ground | 8 |
| ML_0(n) | ML_0(n) | ML_0(n) | ML_0(p) | ML_0(p) | 9 |
| ML_0(p) | ML_0(p) | ML_0(p) | ML_0(n) | ML_0(n) | 10 |

TABLE 2

| DisplayPort Signals Routing to the Micro-USB 3.0 Connector | | | | | | |
|---|---|---|---|---|---|---|
| Scheme 13 | Scheme 14 | Scheme 15 | Scheme 16 | Scheme 17 | Scheme 18 | Scheme 19 |
| PWR | PWR | PWR | PWR | PWR | PWR | PWR |
| ML_0(n) | ML_0(n) | ML_0(p) | ML_0(p) | ML_0(n) | ML_0(n) | ML_1(n) |
| ML_0(p) | ML_0(p) | ML_0(n) | ML_0(n) | ML_0(p) | ML_0(p) | ML_1(p) |
| HPD (thru MCU) | HPD (thru MCU) | HPD (thru MCU) | HPD (thru MCU) | HPD (thru MCU) | HPD (thru MCU) | HPD (thru MCU) |
| Ground | Ground | Ground | Ground | Ground | Ground | Ground |
| AUXN | AUXP | AUXN | AUXP | AUXN | AUXP | AUXN |
| AUXP | AUXN | AUXP | AUXN | AUXP | AUXN | AUXP |
| Ground | Ground | Ground | Ground | Ground | Ground | Ground |
| ML_1(n) | ML_1(n) | ML_1(n) | ML_1(n) | ML_1(p) | ML_1(p) | ML_0(n) |
| ML_1(p) | ML_1(p) | ML_1(p) | ML_1(p) | ML_1(n) | ML_1(n) | ML_0(p) |

| DisplayPort Signals Routing to the Micro-USB 3.0 Connector | | | | | Micro-USB 3.0 Connector Pin |
|---|---|---|---|---|---|
| Scheme 20 | Scheme 21 | Scheme 22 | Scheme 23 | Scheme 24 | Numbers N/A |
| PWR | PWR | PWR | PWR | PWR | 1 |
| ML_1(n) | ML_1(p) | ML_1(p) | ML_1(n) | ML_1(n) | 2 |
| ML_1(p) | ML_1(n) | ML_1(n) | ML_1(p) | ML_1(p) | 3 |
| HPD (thru MCU) | HPD (thru MCU) | HPD (thru MCU) | HPD (thru MCU) | HPD (thru MCU) | 4 |
| Ground | Ground | Ground | Ground | Ground | 5 |
| AUXP | AUXN | AUXP | AUXN | AUXP | 6 |
| AUXN | AUXP | AUXN | AUXP | AUXN | 7 |
| Ground | Ground | Ground | Ground | Ground | 8 |
| ML_0(n) | ML_0(n) | ML_0(n) | ML_0(p) | ML_0(p) | 9 |
| ML_0(p) | ML_0(p) | ML_0(p) | ML_0(n) | ML_0(n) | 10 |

TABLE 3

| DisplayPort Signals Routing to the Micro-USB 3.0 Connector | | | | | | |
|---|---|---|---|---|---|---|
| Scheme 25 | Scheme 26 | Scheme 27 | Scheme 28 | Scheme 29 | Scheme 30 | Scheme 31 |
| PWR | PWR | PWR | PWR | PWR | PWR | PWR |
| ML_0(n) | ML_0(n) | ML_0(p) | ML_0(p) | ML_0(n) | ML_0(n) | ML_1(n) |
| ML_0(p) | ML_0(p) | ML_0(n) | ML_0(n) | ML_0(p) | ML_0(p) | ML_1(p) |
| HPD (thru MCU) | HPD (thru MCU) | HPD (thru MCU) | HPD (thru MCU) | HPD (thru MCU) | HPD (thru MCU) | HPD (thru MCU) |
| Ground | Ground | Ground | Ground | Ground | Ground | Ground |
| ML_1(n) | ML_1(n) | ML_1(n) | ML_1(n) | ML_1(p) | ML_1(p) | ML_0(n) |
| ML_1(p) | ML_1(p) | ML_1(p) | ML_1(p) | ML_1(n) | ML_1(n) | ML_0(p) |
| Ground | Ground | Ground | Ground | Ground | Ground | Ground |

TABLE 3-continued

| AUXN | AUXP | AUXN | AUXP | AUXN | AUXP | AUXN |
| AUXP | AUXN | AUXP | AUXN | AUXP | AUXN | AUXP |

| DisplayPort Signals Routing to the Micro-USB 3.0 Connector | | | | | Micro-USB 3.0 Connector Pin |
|---|---|---|---|---|---|
| Scheme 32 | Scheme 33 | Scheme 34 | Scheme 35 | Scheme 36 | Numbers N/A |
| PWR | PWR | PWR | PWR | PWR | 1 |
| ML_1(n) | ML_1(p) | ML_1(p) | ML_1(n) | ML_1(n) | 2 |
| ML_1(p) | ML_1(n) | ML_1(n) | ML_1(p) | ML_1(p) | 3 |
| HPD (thru MCU) | HPD (thru MCU) | HPD (thru MCU) | HPD (thru MCU) | HPD (thru MCU) | 4 |
| Ground | Ground | Ground | Ground | Ground | 5 |
| ML_0(n) | ML_0(n) | ML_0(n) | ML_0(p) | ML_0(p) | 6 |
| ML_0(p) | ML_0(p) | ML_0(p) | ML_0(n) | ML_0(n) | 7 |
| Ground | Ground | Ground | Ground | Ground | 8 |
| AUXP | AUXN | AUXP | AUXN | AUXP | 9 |
| AUXN | AUXP | AUXN | AUXP | AUXN | 10 |

Figure 6:
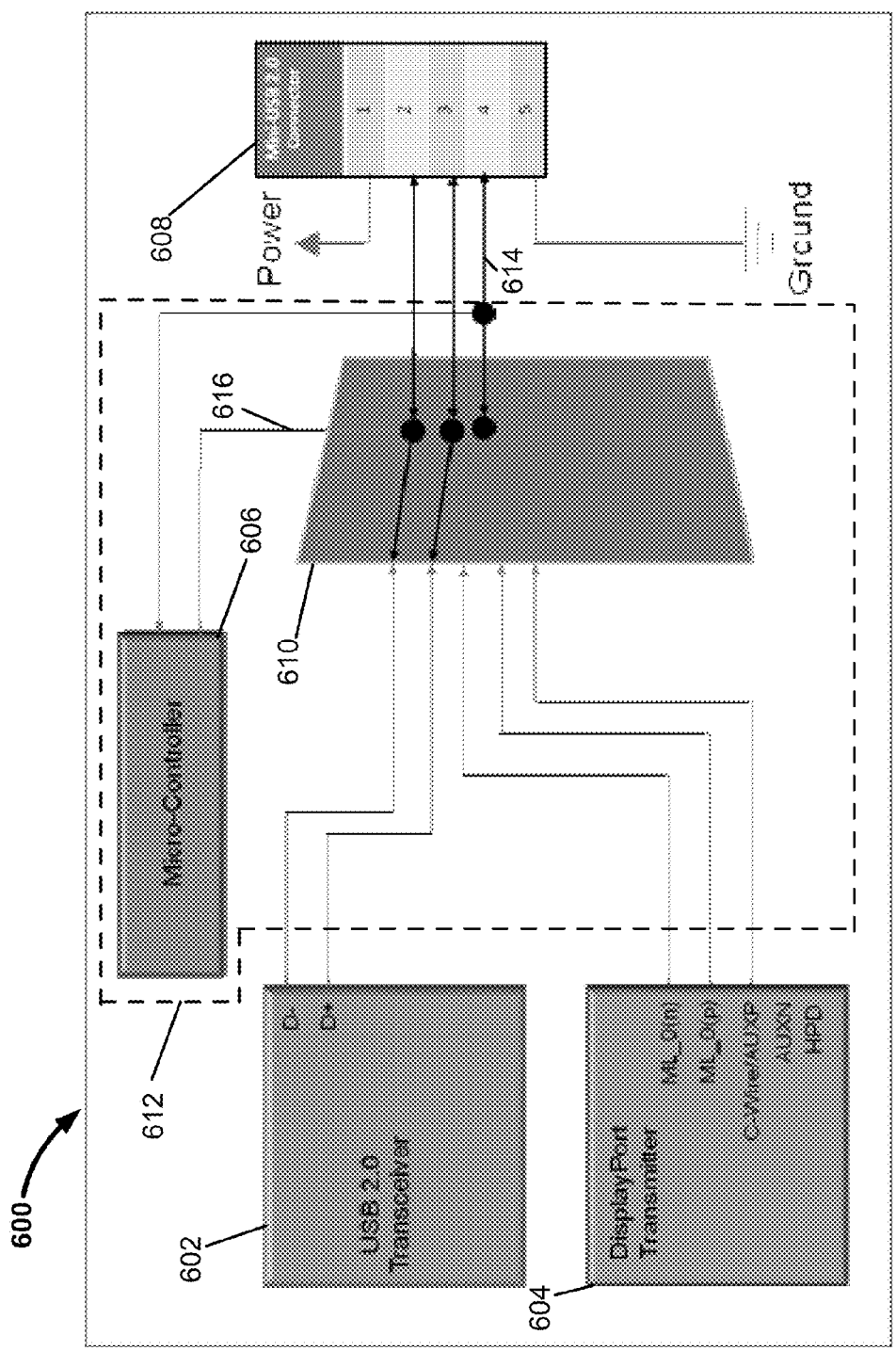
FIG. 6 is a block diagram of a exemplary data communication mechanism compatible with a Mini-USB 2.0 connector and selectively operating in a USB mode.

FIG. 6 is a block diagram of a exemplary system 600 for a source device having a Mini-USB 2.0 connector and selectively operating in a USB mode. The system 600 includes a USB 2.0 transceiver circuit 602, a DisplayPort transmitter circuit 604, a selection circuit 612, and a Mini-USB 2.0 connector 608. The USB 2.0 transceiver circuit 602 conforms to a USB 2.0 standard and may supply a data positive signal (D+), and a data negative signal (D−). The Mini-USB 2.0 connector 608 is also referred to herein as USB port 608 for the source device, see e.g., source device 102 and USB port 104 in FIG. 1.

The DisplayPort transmitter circuit 604 may transmit uncompressed high definition media signals. The uncompressed high definition media signals may be multimedia signals comprising both uncompressed high definition video and compressed or uncompressed audio. DisplayPort transmitter circuit 604 provides uncompressed high definition media or multimedia signals based at least in part on a DisplayPort standard and include at least one differential video data pair, i.e., ML_0(n) and ML_0(p), defining a lane in accordance with a DisplayPort standard. The DisplayPort transmitter circuit 604 provides uncompressed high definition media data that may include side-band communication data. In the example in FIG. 6, the side-band communication data is shown as a single C-wire signal that may be based on one or more of an Auxiliary channel positive signal (AUXP), an Auxiliary channel negative signal (AUXN), and a Hot Plug Detect signal (HPD) of the DisplayPort protocol.

The selection circuit 612 includes a micro-controller 606 and a switch 610. The switch 610 may be an analog switch or other type of switch. The selection circuit 612 may selectively couple the USB 2.0 transceiver circuit 602 or the DisplayPort transmitter circuit 604 to the USB port 608 based on an indication in form of a data format signal 614 received at the USB port 608. The data format signal 614 may be received at a pin of the USB port 608 (see e.g., pin 4 of USB port 608 in the example). The pin of the USB port 608 may receive the device type indication from an external interface (see e.g., cables 114 and 116 in FIG. 1). The data format signal 614 is coupled to the micro-controller 606. In some embodiments, the micro-controller 606 may generate a selection signal 616 based on the data format signal 614 to cause the switch 610 to selectively couple either the USB 2.0 transceiver circuit 602 or the DisplayPort transmitter circuit 604 to the USB port 608. The micro-controller 606 may be a standalone device or be embedded in another device such as an application processor.

The data format signal 614 is a signal as described above for the data format signal 214 in FIG. 2, except for being received at a different type of connector (i.e., a Micro-USB 3.0 connector 208 in FIG. 2 and Mini-USB 2.0 connector 608 in FIG. 6). In the example in FIG. 6, responsive to the indication of a detection state associated with USB compatibility, the micro-controller 606 generates a selection signal 616 to cause the switch 610 to couple the USB 2.0 transceiver 602 to the USB port 608. For example, a USB cable such as USB cable 114 in FIG. 1A may provide one of ground, floating, 124 k ohm, 68 k ohm, and 36.5 k ohm impedance detection states in FIG. 3 to provide an indication of USB compatibility.

Figure 7:
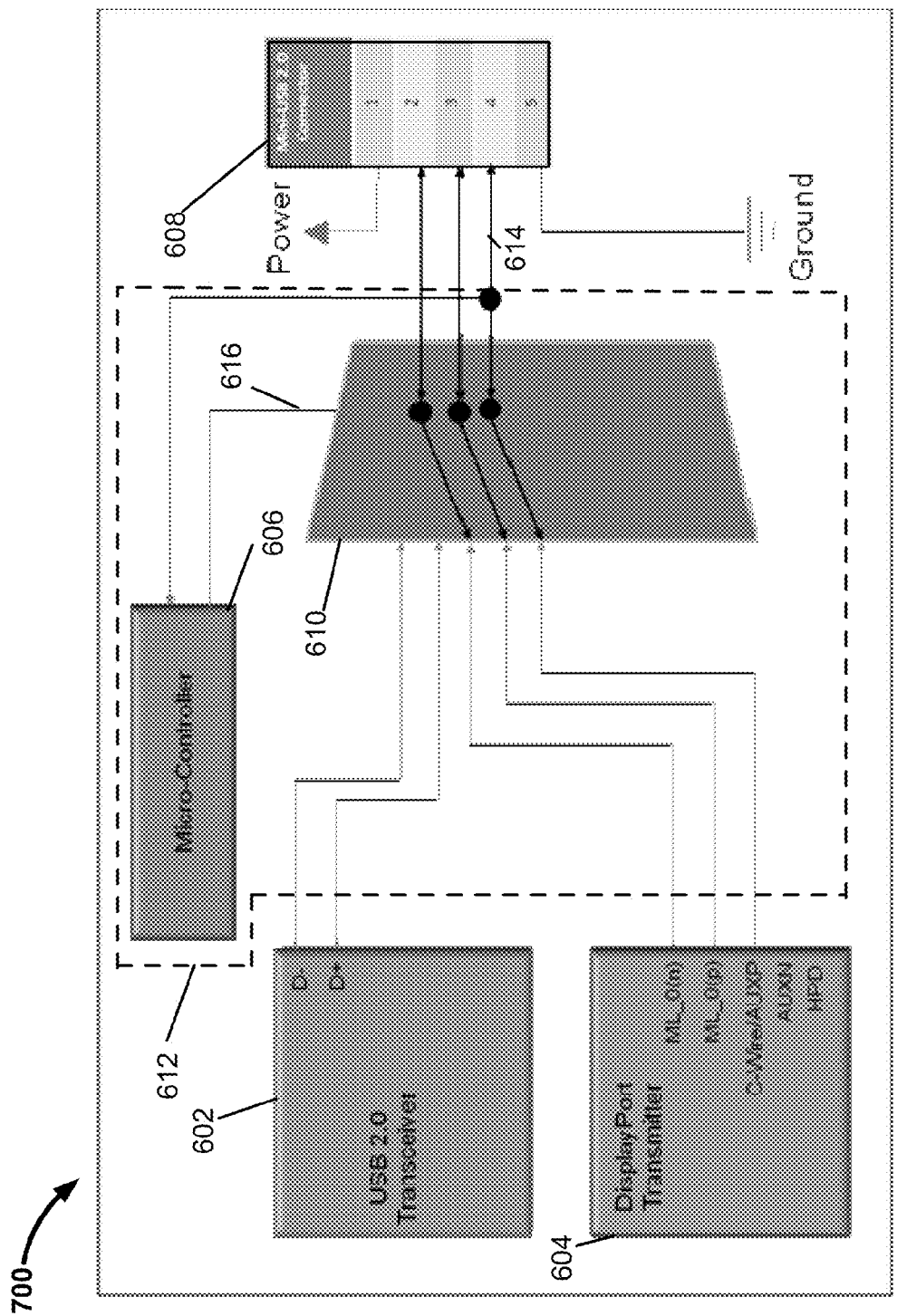
FIG. 7 is a block diagram of a exemplary data communication mechanism compatible with a Mini-USB 2.0 connector and selectively operating in a media mode.

As described above, a detection state shown in FIG. 3 corresponding to a 10 k ohm impedance indicates compatibility with a HD uncompressed media data signal cable, i.e., a media mode. In response to an indication of a media mode, the micro-controller 606 of selection circuit 612 generates a selection signal 616 to cause the switch 610 to couple the DisplayPort transmitter 604 to the USB port 608. FIG. 7 is a block diagram of a exemplary system 700 for a source device having a Mini-USB 2.0 connector and selectively operating in a media mode.

By way of example, if the media cable 116 in FIG. 1A provides the 10 k ohm impedance and couples the second sink device 110 and the source device 102, a system 700 in the source device 102 may couple signals from the DisplayPort transmitter 604 to the USB port 608 for supplying via the media cable 116 to the sink device 110. The second sink device 110 may be operative to generate a display and/or audio presentation from the received signals. The process of selective transmission of data as a function of the device type indication is further illustrated in FIGS. 12 and 13, as described further above.

Figure 8:
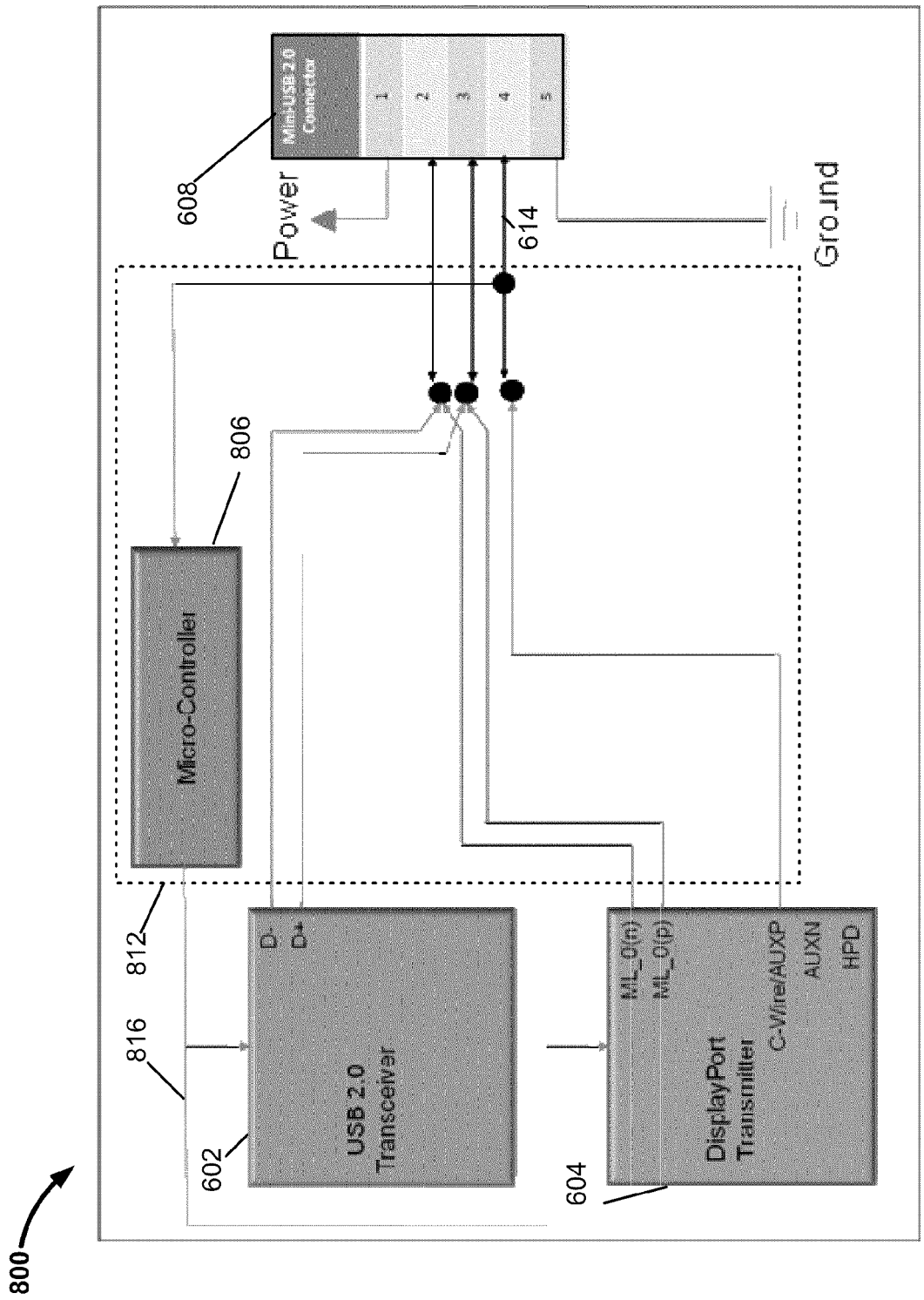
FIG. 8 is a block diagram of a exemplary data communication mechanism compatible with a Mini-USB 2.0 connector in accordance with some embodiments.

FIG. 8 is a block diagram of a exemplary system 800 for a source device having a Mini-USB 2.0 connector in accordance with some embodiments. The system 800 includes a USB 2.0 transceiver circuit 602, a DisplayPort transmitter circuit 604, and a Mini-USB 2.0 connector 608, similar to the systems 600 and 700 in FIGS. 6 and 7. System 800 has a different selection circuit, i.e., selection circuit 812, which does not include a switch. The selection circuit 812 includes a micro-controller 806 coupled to the USB 2.0 transceiver circuit 602 and the DisplayPort transmitter circuit 604. Certain outputs from the USB 2.0 transceiver circuit 602 and DisplayPort transmitter circuit 604 to be selectively coupled to the same pin of the connector 608 may be joined as shown in FIG. 8.

The micro-controller 806 of the selection circuit 812 may selectively couple the USB 2.0 transceiver circuit 602 or the DisplayPort transmitter circuit 604 to the USB port 608 based on a data format signal 614 received at the USB port 608. A selection signal 816 may be generated by the micro-controller 806. The USB 2.0 transceiver circuit 602 or the DisplayPort transmitter circuit 604 may be enabled to communicate with the USB port 608 based on the selection signal 816. The micro-controller 806 may be a standalone device or be embedded in another device such as an application processor.

Figure 10:
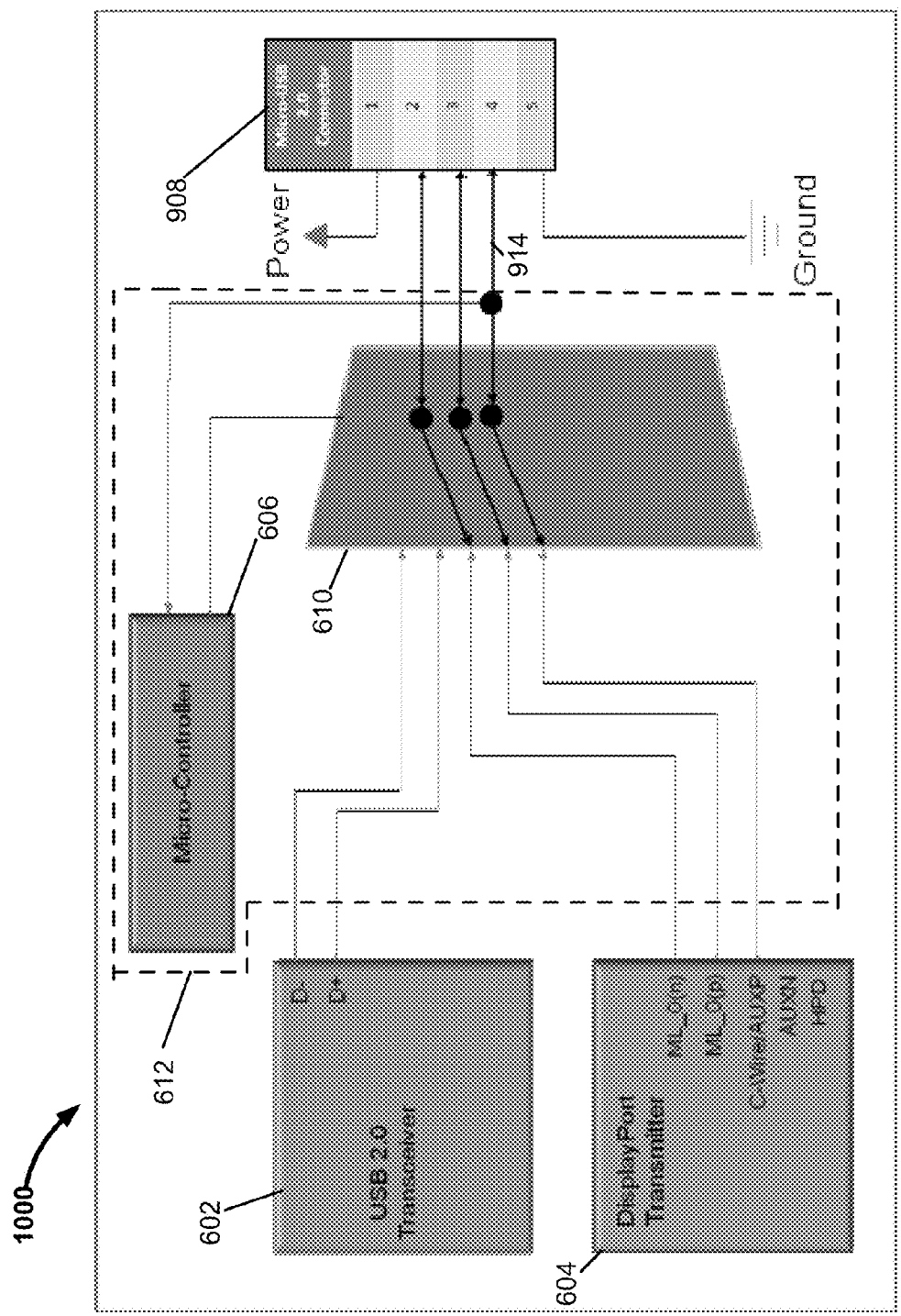
FIG. 10 is a block diagram of a exemplary data communication mechanism compatible with a Micro-USB 2.0 connector and selectively operating in a media mode.

According to various embodiments, signals from the DisplayPort transmitter circuit 604 may be selectively coupled to different pins of the USB port, e.g., Mini-USB 2.0 connector 608 in FIGS. 6, 7, and 8. Table 4 illustrates schemes 1-12 for various combinations of DisplayPort signals routing to the Mini-USB 2.0 connector and Mini-USB 2.0 connector pin numbers that may be used in some embodiments.

tively operating in a media mode. The system 700 in FIG. 7 and the system 1000 both illustrate the media mode. The only differences are the type of USB 2.0 connector in the system and the data format signal received at that different type of USB 2.0 connector. More specifically, the system 100 has a Micro-USB 2.0 connector 908 for the USB port and a data format signal 914 received thereat. In contrast, system 700 has a Mini-USB connector 608 for the USB port and a data format signal 614 received thereat. Otherwise, the systems 600 and 1000 are the same and both illustrate the media mode wherein the DisplayPort transmitter circuit 604 is coupled to the respective USB port. Therefore, FIG. 10 is a system as described above for FIG. 7, except for the connector and data format signal differences identified above.

Figure 11:
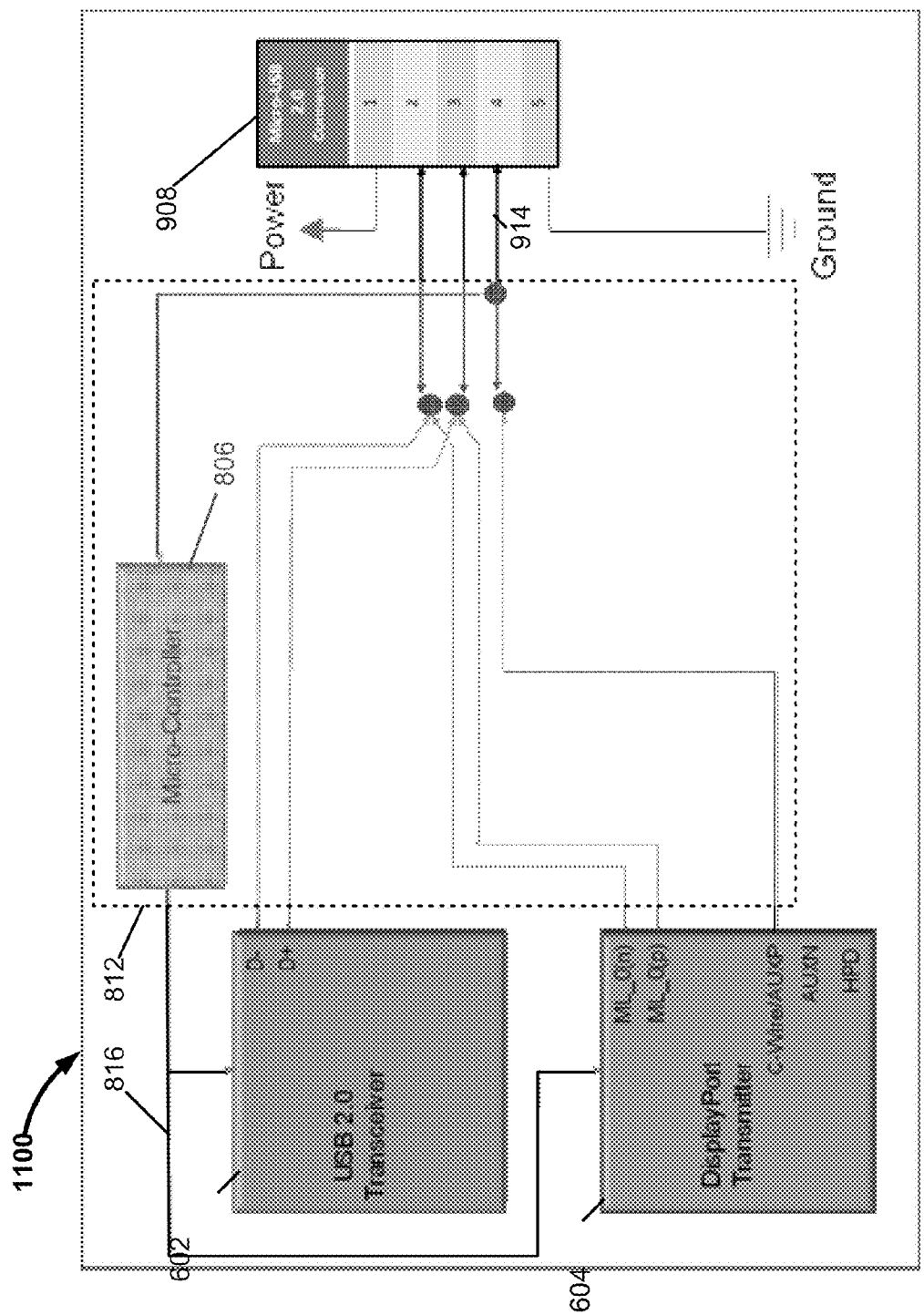
FIG. 11 is a block diagram of a exemplary data communication mechanism compatible with a Micro-USB 2.0 connector in accordance with some embodiments.

FIG. 11 is a block diagram of a exemplary system 1100 for a source device having a Micro-USB 2.0 connector in accordance with some embodiments. The only differences between the system 1100 and the system 800 in FIG. 8 are the type of USB 2.0 connector in the system and the data format signal

TABLE 4

| DisplayPort Signals Routing to the Mini-USB 2.0 Connector | | | | | | |
|---|---|---|---|---|---|---|
| Scheme 1 | Scheme 2 | Scheme 3 | Scheme 4 | Scheme 5 | Scheme 6 | Scheme 7 |
| AUXP | AUXN | AUXP | AUXN | ML_0(p) | ML_0(p) | ML_0(n) |
| ML_0(n) | ML_0(n) | ML_0(p) | ML_0(p) | ML_0(n) | ML_0(n) | ML_0(p) |
| ML_0(p) | ML_0(p) | ML_0(n) | ML_0(n) | AUXP | AUXN | AUXP |
| HPD (thru MCU) | HPD (thru MCU) | HPD (thru MCU) | HPD (thru MCU) | HPD (thru MCU) | HPD (thru MCU) | HPD (thru MCU) |
| Ground | Ground | Ground | Ground | Ground | Ground | Ground |

| DisplayPort Signals Routing to the Mini-USB 2.0 Connector | | | | | Mini-USB 2.0 Connector Pin |
|---|---|---|---|---|---|
| Scheme 8 | Scheme 9 | Scheme 10 | Scheme 11 | Scheme 12 | Numbers N/A |
| ML_0(n) | ML_0(p) | ML_0(p) | ML_0(n) | ML_0(n) | 1 |
| ML_0(p) | AUXP | AUXP | AUXP | AUXN | 2 |
| AUXN | ML_0(n) | ML_0(n) | ML_0(p) | ML_0(p) | 3 |
| HPD (thru MCU) | HPD (thru MCU) | HPD (thru MCU) | HPD (thru MCU) | HPD (thru MCU) | 4 |
| Ground | Ground | Ground | Ground | Ground | 5 |

Figure 9:
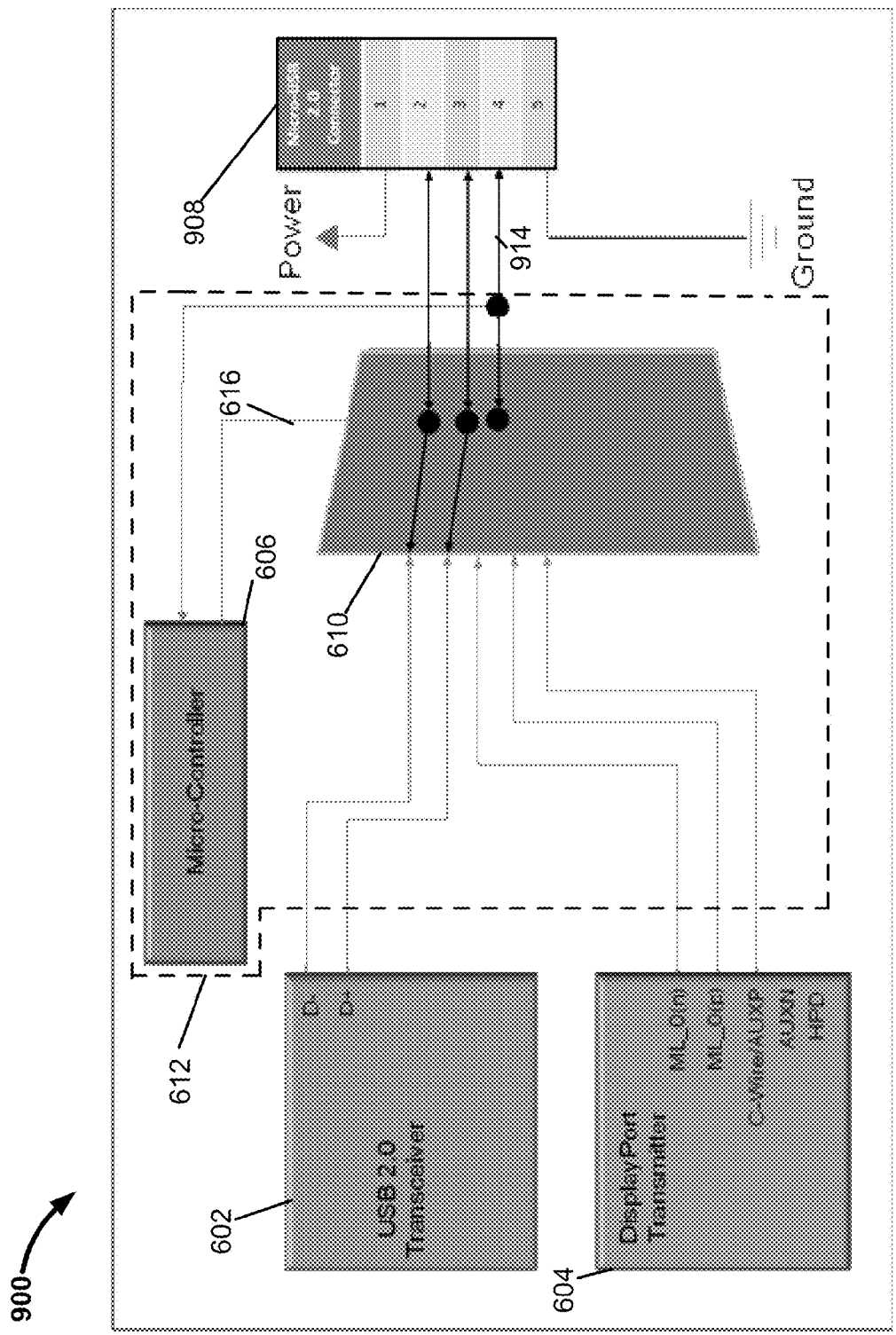
FIG. 9 is a block diagram of a exemplary data communication mechanism compatible with a Micro-USB 2.0 connector and selectively operating in a USB mode.

FIG. 9 is a block diagram of a exemplary system 900 for a source device having a Micro-USB 2.0 connector and selectively operating in a USB mode. The only differences between the system 900 and the system 600 are the type of USB 2.0 connector in the system and the data format signal received at that different type of USB 2.0 connector. More specifically, the system 900 has a Micro-USB 2.0 connector 908 for the USB port and a data format signal 914 received thereat. In contrast, system 600 has a Mini-USB connector 608 for the USB port and a data format signal 614 received thereat. Otherwise, the systems 600 and 900 are the same and illustrate the USB mode wherein the USB 2.0 transceiver circuit 602 is coupled to the respective USB port. Therefore, FIG. 9 is a system as described above for FIG. 6, except for the connector and data format signal differences identified above.

FIG. 10 is a block diagram of a exemplary system 1000 for a source device having a Micro-USB 2.0 connector and selecreceived at that different type of USB 2.0 connector. More specifically, the system 1100 has a Micro-USB 2.0 connector 908 for the USB port and a data format signal 914 received thereat. In contrast, system 800 has a Mini-USB connector 608 for the USB port and a data format signal 614 received thereat. Otherwise, the systems 1100 and 800 are the same and both illustrate a configuration having a selection circuit 812 that does not include a separate switch. Therefore, FIG. 11 is a system as described above for FIG. 8, except for the connector and data format signal differences identified above.

According to various embodiments, signals from the DisplayPort transmitter circuit 604 may be selectively coupled to different pins of the USB port, e.g., Micro-USB 2.0 connector 908 in FIGS. 9, 10, and 11. Table 5 illustrates schemes 1-12 for various combinations of DisplayPort signals routing to the Micro-USB 2.0 connector and Micro-USB 2.0 connector pin numbers that may be used in some embodiments.

TABLE 5

DisplayPort Signals Routing to the Micro-USB 2.0 Connector

| Scheme 1 | Scheme 2 | Scheme 3 | Scheme 4 | Scheme 5 | Scheme 6 | Scheme 7 |
|---|---|---|---|---|---|---|
| AUXP | AUXN | AUXP | AUXN | ML_0(p) | ML_0(p) | ML_0(n) |
| ML_0(n) | ML_0(n) | ML_0(p) | ML_0(p) | ML_0(n) | ML_0(n) | ML_0(p) |
| ML_0(p) | ML_0(p) | ML_0(n) | ML_0(n) | AUXP | AUXN | AUXP |
| HPD (thru MCU) | HPD (thru MCU) | HPD (thru MCU) | HPD (thru MCU) | HPD (thru MCU) | HPD (thru MCU) | HPD (thru MCU) |
| Ground | Ground | Ground | Ground | Ground | Ground | Ground |

| DisplayPort Signals Routing to the Micro-USB 2.0 Connector | | | | | Micro-USB 2.0 Connector Pin |
|---|---|---|---|---|---|
| Scheme 8 | Scheme 9 | Scheme 10 | Scheme 11 | Scheme 12 | Numbers N/A |
| ML_0(n) | ML_0(p) | ML_0(p) | ML_0(n) | ML_0(n) | 1 |
| ML_0(p) | AUXP | AUXP | AUXP | AUXN | 2 |
| AUXN | ML_0(n) | ML_0(n) | ML_0(p) | ML_0(p) | 3 |
| HPD (thru MCU) | HPD (thru MCU) | HPD (thru MCU) | HPD (thru MCU) | HPD (thru MCU) | 4 |
| Ground | Ground | Ground | Ground | Ground | 5 |

Figure 12:
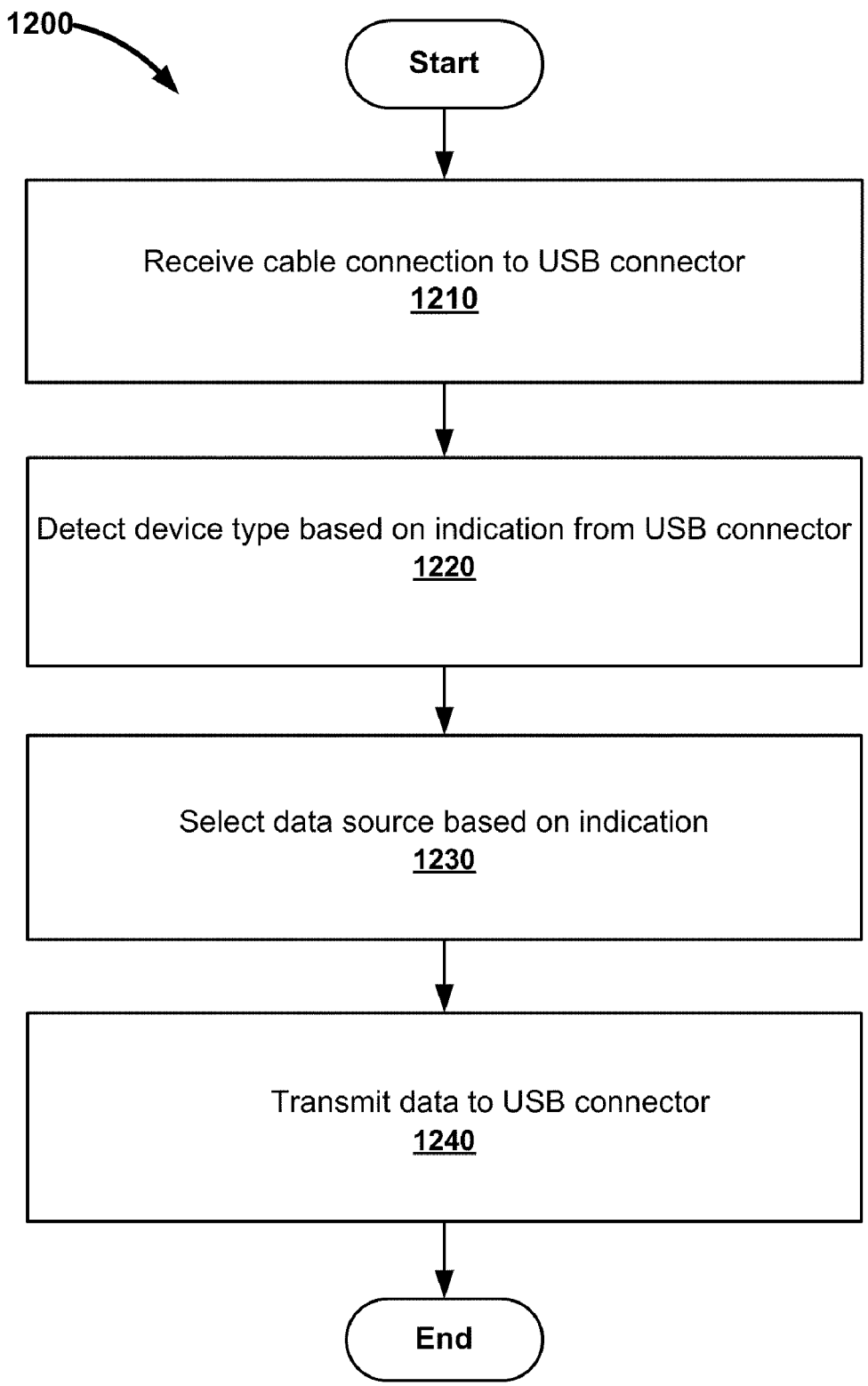
FIG. 12 is a flow chart of an exemplary method for transferring data.

FIG. 12 is a flow chart of an exemplary method 1200 for transferring data. A cable connection to the USB connector (see e.g., connectors 104 and 208 in FIGS. 1 and 2 respectively) is received at step 1210. A device type is detected based on an indication from the USB connector at step 1220 (see e.g., detection state/compatibility in FIG. 3). Detecting a device is discussed in more detail below with regards to the method of FIG. 13. A data source is selected based on the indication at step 1230. According to various embodiments, selection may be made between a USB protocol data source and an uncompressed high definition media data source (see e.g., FIG. 2). Data is transmitted to the USB connector at step 1240.

Figure 13:
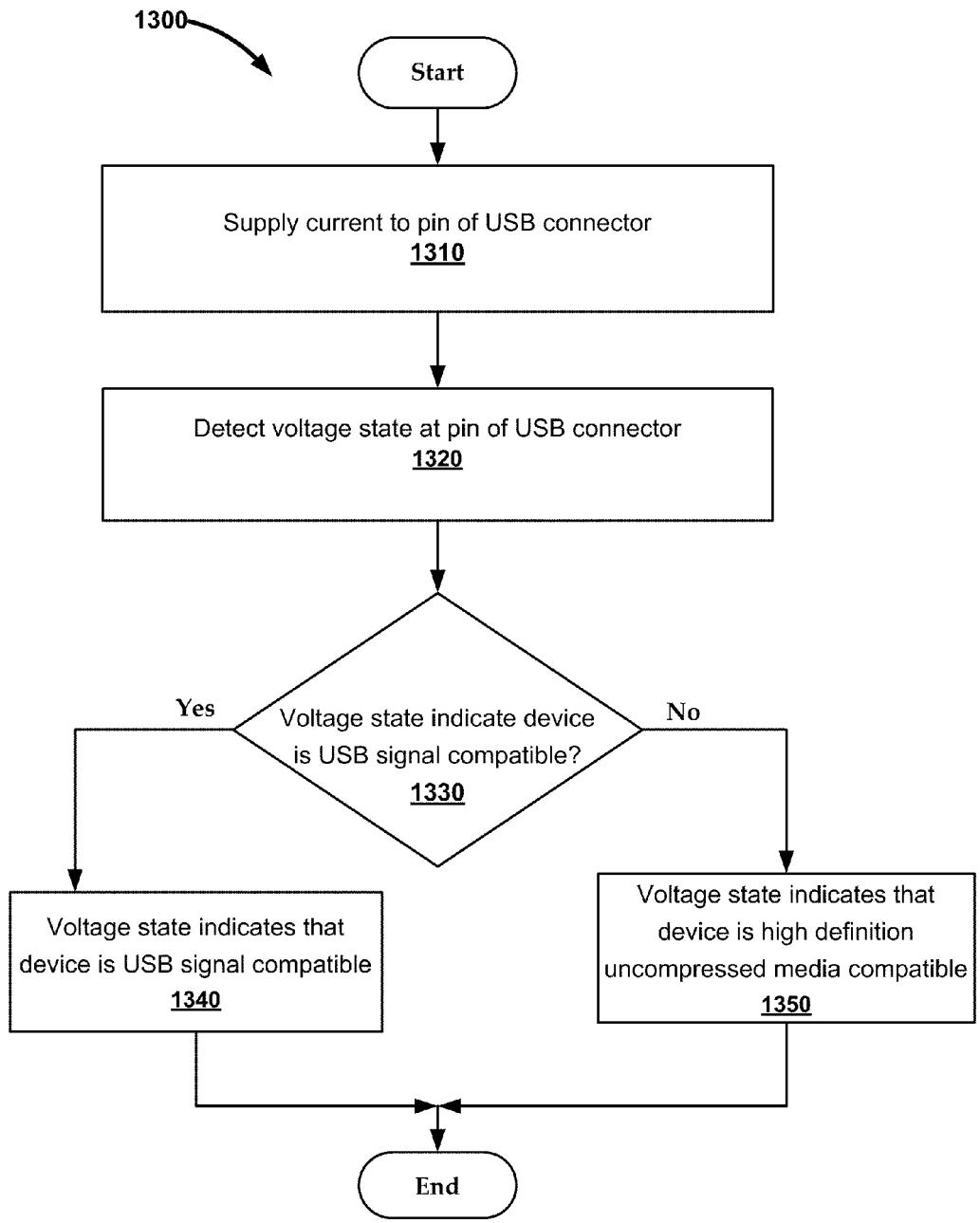
FIG. 13 is a flow chart of an exemplary method for detecting the device type based on the indication from the USB connector.

FIG. 13 is a flow chart of an exemplary method 1300 for detecting the device type based on the indication from the USB connector. A current may be supplied to a pin of USB connector at step 1310. The pin may be associated with an identification signal, such as for example pin 4 of a micro-USB 3.0 compatible port. A voltage state is detected at pin of USB connector at step 1320. The voltage state may be the voltage detected at the particular pin when a current is provided to the pin. A determination is made at step 1330 whether the voltage state indicates the device is USB signal compatible. The determination may be made based on the voltage state (i.e., voltage level, as indicated in FIG. 3). If the voltage state indicates that the device is USB signal compatible, the process proceeds to step 1340 where the device type is set as USB compatible accordingly. If the voltage state indicates that the device is not USB signal compatible, the device type is set as being high definition uncompressed media compatible at step 1350, and the process proceeds to the end.

Figure 14:
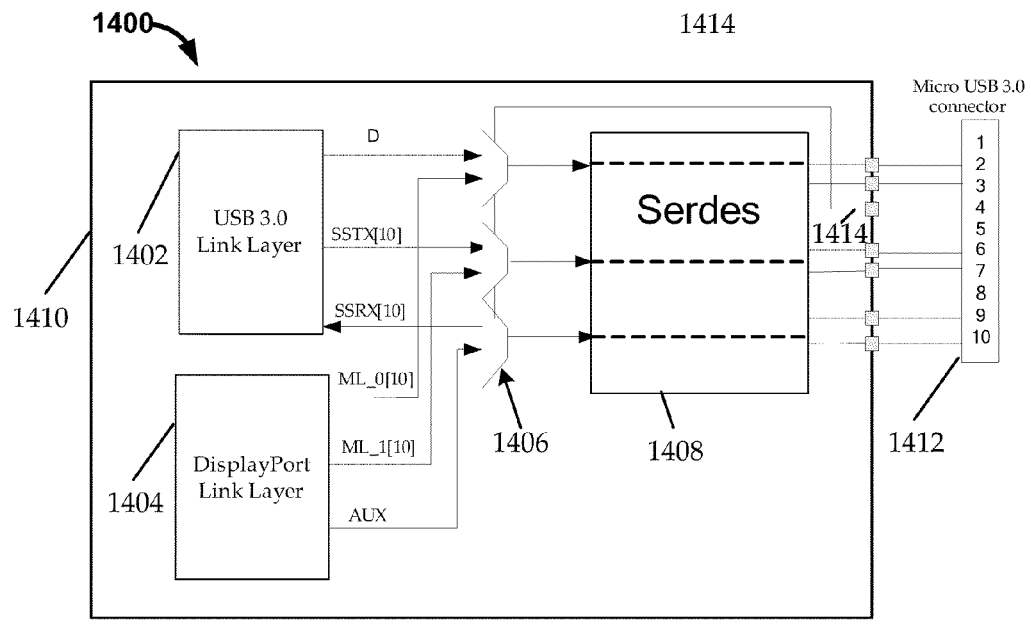
FIG. 14 is a block diagram of a exemplary data communication mechanism compatible with a Micro-USB 3.0 connector in accordance with some embodiments.

FIG. 14 is a block diagram of a exemplary system 1400 for a source device having a Micro-USB 3.0 connector in accordance with some embodiments. The system 1400 includes a semiconductor device 1410 and a Micro-USB 3.0 connector 1412 coupled thereto. The Micro-USB 3.0 connector 1412 is a USB port for coupling to an external interface having a mating connector. The semiconductor device 1410 may include a USB 3.0 link layer circuit 1402, a DisplayPort link layer circuit 1404, a multiplexer 1406, and a serializer/deserializer (Serdes) circuit 1408. The USB 3.0 Link Layer circuit 1402 may be a USB transceiver circuit operative to send and receive USB 3.0 protocol signals, such as D, SSTX[10], and SSRX[10] shown in FIG. 14. The DisplayPort link layer circuit 1404 may be a transmitter circuit operative to transmit uncompressed high definition media signals, such as ML_0 [10], ML_1[10], and AUX. ML_0[10] and ML_1[10] that represent respective DisplayPort main link lane numbers 0 and 1 for uncompressed high definition video and/or audio data. AUX represents a side-band communication signal. The multiplexer 1406 is configurable to selectively couple the USB 3.0 Link Layer circuit 1402 or the DisplayPort link layer circuit 1404 to the Serdes circuit 1408 based on a data format signal 1414 received at the USB port 1412 from the external interface. Since the USB 3.0 parallel data speed is 500 MHz and DisplayPort data speed is 270 MHz, a digital multiplexer 1406 configurable for switching between the two types of data and respective data speeds may be used.

The data format signal 1414 provides a device type indication and may be based on an impedance (see e.g., FIGS. 3, 12 and 13 described above regarding detecting a device type based on the indication). The data format signal 1414 is also described above with regards to other data format signals received at various connectors including data formal signal 214 in FIG. 2 for a Micro-USB 3.0 connector, data formal signal 614 in FIG. 6 for a Mini-USB 2.0 connector, and data formal signal 914 in FIG. 9 for a Micro-USB 2.0 connector. Although the data format signal 1414 is shown at pin 4 of the Micro-USB 3.0 connector 1414, a different suitable pin may be used in some embodiments.

According to various embodiments of the system 1400, the multiplexer 1406 is operative to selectively couple the USB 3.0 Link Layer circuit 1402 to the Serdes circuit 1408 in response to the data format signal 1414 being indicative of a USB data format, i.e., USB mode. The multiplexer 1406 may be operative to selectively couple DisplayPort link layer circuit 1404 to the Serdes circuit 1408 in response to the data format signal 1414 being indicative of a media data format, i.e., media mode. In some embodiments, the Serdes circuit 1408 is operative to provide a plurality of signals configured for transmission via the Micro-USB 3.0 connector 1412 to the external interface. The configured plurality of signals from Serdes circuit 1408 may be coupled to the Micro-USB 3.0 connector 1412, i.e., the USB port.

Although the system 1400 includes a Micro-USB 3.0 connector, other types of USB connectors may be used including, but not limited to, various Micro-USB 2.0 connector types and Mini-USB 2.0 connector types. An exemplary system having a Micro-USB 2.0 connector is illustrated in FIG. 15.

Figure 15:
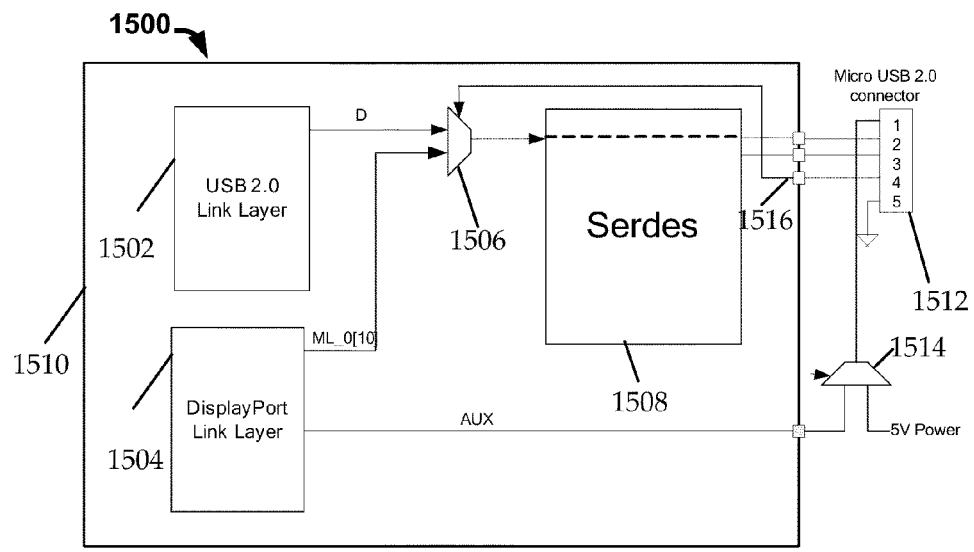
FIG. 15 is a block diagram of a exemplary data communication mechanism compatible with a Micro-USB 2.0 connector in accordance with some embodiments.

FIG. 15 is a block diagram of a exemplary system 1500 for a source device having a Micro-USB 2.0 connector in accordance with some embodiments. The system 1500 includes a semiconductor device 1510 and a Micro-USB 2.0 connector 1512 coupled thereto. The Micro-USB 2.0 connector 1512 is a USB port for coupling to an external interface having a mating connector. The semiconductor device 1510 may include a USB 2.0 link layer circuit 1502, a DisplayPort link layer circuit 1504, a multiplexer 1506, and a serializer/deserializer (Serdes) circuit 1508. The USB 2.0 Link Layer circuit 1502 may be a USB transceiver circuit operative to send and receive USB 2.0 protocol signals, such as D shown in FIG. 15. The DisplayPort link layer circuit 1504 may be a transmitter circuit operative to transmit uncompressed high definition media signals, such as ML_0[10] and AUX. ML_0[10] represents a DisplayPort main link lane number 0 for uncompressed high definition video and/or audio data. AUX represents a side-band communication signal. The multiplexer 1506 is configurable to selectively couple the USB 2.0 Link Layer circuit 1502 or the DisplayPort link layer circuit 1504 to the Serdes circuit 1508 based on a data format signal 1514 received at the USB port 1512 from the external interface. Since the USB 2.0 parallel data speed is 480 MHz and DisplayPort data speed is 270 MHz, a digital multiplexer 1406 configurable for switching between the two types of data and respective data speeds may be used.

The data format signal 1514 provides a device type indication and may be based on an impedance (see e.g., FIGS. 3, 12 and 13 regarding detecting a device type based on the indication). The data format signal 1514 is also described above with regards to other data format signals received at various connectors including data formal signal 214 in FIG. 2 for a Micro-USB 3.0 connector, data formal signal 614 in FIG. 6 for a Mini-USB 2.0 connector, and data formal signal 914 in FIG. 9 for a Micro-USB 2.0 connector. Although the data format signal 1514 is shown at pin 4 of the Micro-USB 2.0 connector 1514, a different suitable pin may be used in some embodiments.

According to various embodiments of the system 1500, the multiplexer 1506 is operative to selectively couple the USB 2.0 Link Layer circuit 1502 to the Serdes circuit 1508 in response to the data format signal 1514 being indicative of a USB data format, i.e., USB mode. The multiplexer 1506 may be operative to selectively couple the DisplayPort link layer circuit 1504 to the Serdes circuit 1508 in response to the data format signal 1514 being indicative of a media data format, i.e., media mode. As shown in FIG. 15, the ML_0[10] signal is coupled to the multiplexer 1506 and may be configured by the Serdes circuit 1508 for coupling to the USB port in the media mode.

In some embodiments, a 5 V power signal and the AUX side-band communication signal from the DisplayPort link layer circuit 1504 are coupled to a multiplexer 1514. Based on the data format signal 1516, the multiplexer 1514 selectively couples the AUX signal of the 5 V power signal to the Micro-USB 2.0 connector 1512, e.g., pin 1 in FIG. 15. In the USB mode, the 5V power may be coupled to pin 1 to provide power for charging, etc., whereas, in the media mode the AUX signal may be coupled to pin 1 for side-band communication The Serdes circuit 1508 may be operative to provide a plurality of signals configured for transmission via the Micro-USB 2.0 connector 1512 to the external interface. The configured plurality of signals from Serdes circuit 1508 may be coupled to the Micro-USB 2.0 connector 1512, i.e., the USB port.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

The invention claimed is:

1. A method for selectively communicating data via a USB port of a first device, the method comprising:
receiving an indication of a device type by the first device, the indication being received at the USB port from an external interface, the indication being indicative of a USB mode or a media mode;
generating a selection signal based on the received indication by the first device; and
causing Universal Serial Bus (USB) protocol data or uncompressed high definition media data to be selectively supplied to the USB port based on the selection signal by the first device, such that the selectively supplied data can be transmitted via the USB port to the external interface; wherein the uncompressed high definition media data comprises at least one lane of data in accordance with a DisplayPort standard.

2. The method of claim 1, further comprising detecting that a second device is communicatively coupled to the USB port over the external interface.

3. The method of claim 2, further comprising transmitting by the first device the selected data via the USB port over the external interface to the second device.

4. The method of claim 1, further comprising, in the USB mode, configuring the first device to receive USB protocol data via the USB port from the external interface.

5. The method of claim 1, wherein the USB protocol data is supplied by a USB transceiver of the first device.

6. The method of claim 2, wherein the indication of the device type is indicative of the device type for a port of a second device if the port of the second device is coupled to the first device by the external interface.

7. The method of claim 1, further comprising supplying the uncompressed high definition media data from a transmitter of the first device.

8. The method of claim 1, further comprising causing Universal Serial Bus (USB) protocol data or audio data to be selectively supplied to the USB port based on the selection signal by the first device, such that multimedia data comprising both video data and audio data can be transmitted via the USB port to an external interface.

9. The method of claim 1, wherein the uncompressed high definition media data further comprises one or more of audio data and side-band communication data.

10. The method of claim 1, wherein the external interface is operative to communicatively couple the USB port of the first device to a second device and comprises a cable.

11. A system for transferring data, the system comprising:
a universal serial bus (USB) port;
a USB transceiver circuit operative to send and receive USB protocol data signals;
a transmitter circuit operative to transmit uncompressed high definition media signals, wherein the uncompressed high definition media signals are based at least in part on a DisplayPort standard; and
a selection circuit operative to selectively couple the USB transceiver circuit or the transmitter circuit to the USB port based on an indication received at the USB port from an external interface, the indication being a data format signal indicative of a USB mode or a media mode.

12. The system of claim 11, wherein the selection circuit comprises a controller coupled to the USB transceiver circuit and the transmitter circuit.

13. The system of claim 12, wherein the controller enables either of the USB transceiver circuit or the transmitter circuit to communicate with the USB port as a function of the data format signal.

14. The system of claim 11, wherein the selection circuit comprises a controller coupled to an analog switch.

15. The system of claim 14, wherein the controller is operative to cause the analog switch to couple the USB transceiver circuit or the transmitter circuit to the USB port as a function of the data format signal.

16. The system of claim 11, wherein the USB transceiver circuit conforms to a USB 2.0 standard.

17. The system of claim 11, wherein the USB transceiver circuit conforms to a USB 3.0 standard.

18. A system for transferring data via a USB port, comprising:
a first device comprising:
a universal serial bus (USB) port;
a USB transceiver circuit operative to send and receive USB protocol signals;
a transmitter circuit operative to transmit uncompressed high definition media signals, wherein the uncompressed high definition media signals
are based at least in part on a DisplayPort standard; and
a selection circuit operative to selectively couple the USB transceiver circuit or the transmitter circuit to the USB port based on an indication received at the USB port from an external interface, the indication being a data format signal indicative of a USB mode or a media mode; and
an interface unit to communicatively couple the USB port to a port of a second device over the external interface.

19. The system of claim 18, wherein the interface unit is operative to supply the data format signal to the USB port.

20. The system of claim 18, wherein the interface unit includes a cable.

21. The system of claim 18, wherein the interface unit is operative to detect that the second device is communicatively coupled to the USB port over the interface.

22. The system of claim 19, wherein the data format signal is a function of an impedance.

23. The system of claim 18, wherein, if the port of the second device is a USB port and is coupled to the USB port of the first device via the interface unit, the data format signal is indicative of a USB data format and based thereon the selection unit couples the USB transceiver circuit to the USB port of the first device.

24. The system of claim 18, wherein, if the port of the second device is a media port and is coupled to the USB port of the first device via the interface unit, the data format signal is indicative of a media format and based thereon the selection unit couples the transmitter circuit to the USB port of the first device.

25. The system of claim 24, wherein the media format is based on a DisplayPort standard.

26. The system of claim 18, wherein the uncompressed high definition media signals comprise at least one lane in accordance with a DisplayPort standard.

27. The system of claim 26, wherein the uncompressed high definition media signals further comprise one or more of video signals, audio signals and side-band communication signals.

28. The system of claim 18, wherein the selection circuit comprises a controller coupled to the USB transceiver circuit and the transmitter circuit.

29. The system of claim 28, wherein the controller enables either of the USB transceiver circuit or the transmitter circuit to communicate with the USB port as a function of the data format signal.

30. The system of claim 18, wherein the selection circuit comprises a controller coupled to an analog switch.

31. The system of claim 30, wherein the controller is operative to cause the analog switch to couple the USB transceiver circuit or the transmitter circuit to the USB port as a function of the data format signal.

32. The system of claim 18, wherein the USB transceiver circuit conforms to a USB 2.0 standard.

33. The system of claim 18, wherein the USB transceiver circuit conforms to a USB 3.0 standard.

34. A system for transferring data, the system comprising:
a universal serial data bus (USB) port;
a semiconductor device comprising:
a USB transceiver circuit operative to send and receive USB protocol signals;
a transmitter circuit operative to transmit uncompressed high definition media signals, wherein the uncompressed high definition media signals are based at least in part on a DisplayPort standard;
a serializer/deserializer circuit; and
a multiplexer configurable to selectively couple the USB transceiver circuit or the transmitter circuit to the serializer/deserializer based on an indication received at the USB port from an external interface, the indication being a data format signal indicative of a USB mode or a media mode.

35. The system of claim 34, wherein the multiplexer is operative to selectively couple the USB transceiver circuit to the serializer/deserializer circuit in response to the data format signal being indicative of the USB mode, and the multiplexer is operative to selectively couple the transmitter circuit to the serializer/deserializer circuit in response to the data format signal being indicative of the media mode.

36. The system of claim 34, wherein the serializer/deserializer is operative to provide a plurality of signals configured for transmission via the USB port to the external interface.

37. The system of claim 36, wherein the plurality of signals are coupled to the USB port.

* * * * *